(12) United States Patent
Schwarz et al.

(10) Patent No.: US 8,777,795 B2
(45) Date of Patent: Jul. 15, 2014

(54) DEVICE TO REVERSE DIRECTION OF A UNIDIRECTIONAL POWERED DRIVE

(76) Inventors: Phil Schwarz, Hamburg, NJ (US); Greg Schwarz, Hamburg, NJ (US)

( * ) Notice: Subject to any disclaimer, the term of this patent is extended or adjusted under 35 U.S.C. 154(b) by 201 days.

(21) Appl. No.: 13/456,833

(22) Filed: Apr. 26, 2012

(65) Prior Publication Data
US 2013/0288846 A1   Oct. 31, 2013

(51) Int. Cl.
*F16H 3/40* (2006.01)
*F16H 9/00* (2006.01)

(52) U.S. Cl.
USPC .................................. 475/269; 474/3; 74/404

(58) Field of Classification Search
USPC .............. 475/269, 298, 302; 474/3; 180/372, 180/343; 74/333, 352, 404
See application file for complete search history.

(56) References Cited

U.S. PATENT DOCUMENTS

| 2,414,832 | A | | 1/1947 | Orr |
| 3,529,494 | A | * | 9/1970 | Matte ............................ 475/298 |
| 3,851,537 | A | * | 12/1974 | Nickstadt ........................ 74/404 |
| 3,908,483 | A | | 9/1975 | Piquette |
| 4,083,421 | A | | 4/1978 | Van Horn et al. |
| 4,502,353 | A | * | 3/1985 | Beaudoin ....................... 475/298 |
| 4,974,695 | A | | 12/1990 | Politte |
| 5,024,113 | A | | 6/1991 | Ito et al. |
| 5,069,304 | A | | 12/1991 | Mann |
| 5,581,136 | A | | 12/1996 | Li |
| 5,964,678 | A | | 10/1999 | Hanada et al. |
| 6,199,651 | B1 | | 3/2001 | Gay |
| 6,595,894 | B2 | | 7/2003 | Hanatani |
| 6,708,579 | B2 | | 3/2004 | Punko |
| 7,311,636 | B1 | | 12/2007 | Regula |
| 7,815,542 | B2 | * | 10/2010 | Dec ............................... 475/326 |
| 7,952,305 | B2 | | 5/2011 | Fischer et al. |
| 7,997,361 | B1 | | 8/2011 | Bell et al. |
| 8,001,862 | B2 | | 8/2011 | Albulushi et al. |
| 2002/0165061 | A1 | * | 11/2002 | Chen ............................. 475/298 |
| 2010/0267508 | A1 | | 10/2010 | Hvolka et al. |
| 2012/0028751 | A1 | | 2/2012 | Serkh et al. |
| 2013/0340551 | A1 | * | 12/2013 | Grandi ............................ 74/404 |

FOREIGN PATENT DOCUMENTS

GB           2403782 A  *  1/2005

* cited by examiner

*Primary Examiner* — Roger Pang
(74) *Attorney, Agent, or Firm* — The McHattie Law Firm; Jack Baldini, Esq.

(57) ABSTRACT

A device is provided that attaches to a hub of a drive mechanism that utilizes a flat plate, shuttle enabled, engagement/disengagement mechanism to sequentially disengage a forward drive power and then engage a reverse drive power assembly which results in a reverse output of power to the drive mechanism. In a particular application, a device is provided that attaches to the hub of a motorcycle wheel that enables the normal forward drive mechanism to provide reverse power without changing the actual direction of the drive sprocket. An important aspect of the device of the present invention is that the reverse gear package when not in use is completely idle and has absolutely no effect on the forward drive components when not in use.

6 Claims, 21 Drawing Sheets

Alternate Embodiments of Pulleys

FIGURES 19A, B, C and D

DEVICE TO REVERSE DIRECTION OF A UNIDIRECTIONAL POWERED DRIVE

FIELD OF THE INVENTION

A device is provided that attaches to a hub of a drive mechanism that utilizes a flat plate, shuttle enabled, engagement/disengagement mechanism to sequentially disengage a forward drive power and then engage a sun gear of a planetary gear system package which results in a reverse output of power to the drive mechanism. In a particular application, a device is provided that attaches to the hub of a motorcycle wheel that sequentially disengages the forward drive mechanism provided from the drive sprocket without changing the actual direction of the drive sprocket and then engages a sun gear of a planetary gear system package which results in a reverse output of power to the axle. An important aspect of the device of the present invention is that the reverse gear package when not in use is completely idle, that is, it is not mechanically operative with respect to the forward drive package and has absolutely no effect on the forward drive components when not in use.

BACKGROUND

Many vehicles, such as, for example, motorcycles, lawn tractors, and quad bikes and the like, are not typically provided with a reverse gear. As such, users of such vehicles must maneuver the vehicles manually, sometimes requiring physically pushing the vehicle, which can be difficult or even hazardous, depending on the size of the vehicle, the conditions under foot and the strength and agility of the user.

There have been attempts to provide reverse mechanisms to vehicles, such as, for example, motorcycles and the like:

For example, U.S. Pat. No. 8,001,862 B2 discloses a reverse drive assembly for a motorcycle that includes a transmission assembly having a main shaft and a counter shaft. The reverse drive assembly includes a first drive member configured to be coupled to an opposite end of the main shaft, a second drive member configured to be coupled to a second end of the counter shaft, and an engagement member operatively positioned between the second drive member and the counter shaft. The engagement member is movable between a first position out of engagement with the second drive member and the counter shaft, and a second position in engagement between the second drive member and the counter shaft to drive the counter shaft in a reverse direction. In some constructions, the engagement member is operatively positioned between the first drive member and the main shaft.

In another example, U.S. Pat. No. 7,997,361 B1 discloses a reverse drive mechanism [that] is configured to rotate at least one wheel of a multi-wheeled device in a reverse direction so that the device moves in that reverse direction. One particular application involves a motorcycle conversion assembly in which at least one of the rear wheels of the conversion assembly is driven in the reverse direction so as to back-up the motorcycle.

In another example, U.S. Pat. No. 7,952,305 B2 discloses a vehicle comprising a rotatable wheel (e.g., three rotatable wheels), a forward drive mechanism including a forward drive motor (e.g., an internal combustion engine), and a reverse drive mechanism. The reverse drive mechanism includes a reverse drive motor (e.g., an electric motor) adapted to move the chassis in the rearward direction, and a reverse drive control programmed to inhibit operation of the reverse drive mechanism when the forward drive motor is off. In one embodiment, the vehicle includes a battery for operating the reverse drive motor, and the reverse drive control is programmed to inhibit operation of the motor when a characteristic of the battery (e.g., an output voltage) falls below a threshold. The vehicle can further include a temperature sensor for the reverse drive motor. In this embodiment, the reverse drive control is programmed to inhibit operation of the reverse drive motor when the temperature of the motor exceeds a threshold.

In another example, U.S. Pat. No. 7,311,636 B1 discloses a motorcycle wheel attachment for [a] replacement for a rear sheave or sprocket that attaches to the hub of the rear wheel. The outer perimeter of the apparatus resembles the outer perimeter of the replaced motorcycle sheave/sprocket so that the respective drive belt or chain can be affixed around the perimeter. With respect to the belt or chain, the engine and transmission, the attachment functionally replaces the sheave/sprocket. The attachment includes an enclosed inner gear system having a locked and unlocked position. In the locked position, none of the gears rotate with respect to the exterior of the attachment. In the unlocked position, the gears couple to the movement of the exterior of the attachment as well as the drive force exerted by the belt or chain. This coupled movement allows the attachment and wheel to rotate in a reverse direction using the forward drive of the engine, thereby giving the motorcycle reverse power.

In another example, U.S. Pat. No. 6,708,579 B2 discloses a reverse drive for a small vehicle [that] includes a primary driven gear through which an external motor imparts a rotary motion to a first shaft. A worm gear is mounted on and rotates with the first shaft. A worm wheel is mounted on and rotates with a second shaft. The worm wheel engages and is rotated by the worm gear with a gear reduction being effected through engagement of the worm gear and the worm wheel so that the second shaft rotates at a slower speed than the first shaft. A clutch is mounted on the second end of the second shaft, which can be moved between an engaged position and a disengaged position.

In another example, U.S. Pat. No. 6,595,894 B2 discloses a shift control device for a bicycle . . . having a planetary gear assembly for varying the relative angular position between an actuating member and a control member. In a preferred embodiment of the invention, the shift control device includes a control member engageable with a ring gear to drive a plurality of planetary gears about a fixed base member. The fixed base member preferably includes a sun gear integrally attached thereto. The planetary gears are preferably carried by an actuating member configured to pull and release a bicycle shift cable. Rotation of the planetary gears results in the tension or release of the bicycle shift cable. The shift control device can include a positioning mechanism for controlling the position of the actuating member relative the base member.

In another example, U.S. Pat. No. 6,199,651 B1 discloses a vehicle drive assembly with a motor configured for driving the vehicle and including a rotatably driven motor shaft. A first swing arm has a first end housing the motor and a second end pivotably and supportively attachable to a vehicle body, with an elongated portion joining the ends. The vehicle also has a gearbox housing configured for transmitting torque to a road surface through a road engaging member, and a transmission directly engaged with the motor shaft and housed within the gearbox housing. The transmission is configured for transmitting torque from the motor shaft to the housing. A second swing arm is pivotably and supportively attachable to the vehicle body. An axle is fixed to the second swing arm, received within the gearbox housing, and attached to the transmission such that the second swing arm is supported by the transmission. The transmission preferably includes a planetary gear reduction unit with a gear carrier rotationally fixed to the first swing arm and a plurality of gears operatively associated with the shaft and the gearbox housing to transmit torque therebetween. Preferably at least one of the gears is mounted to the gear carrier, more preferably a plurality of planetary gears is mounted to the gear carrier.

In another example, U.S. Pat. No. 5,964,678 discloses a bicycle transmission [that] includes a hub axle, a drive member rotatably mounted around the hub axle, a hub body rotatably mounted around the hub axle, and a planetary gear mechanism coupled between the drive member and the hub body for communicating rotational force from the drive member to the hub body through multiple rotational force transmission paths. The planetary gear mechanism includes a planet gear supported by a planet gear rack for rotation around the hub axle, and a ring gear engaging the planet gear. The ring gear includes a transmission pawl that can be displaced between a first position for transmitting rotational motion between the ring gear and the hub body and a second position for inhibiting the transmission of rotational motion between the ring gear and the hub body. A clutch is mounted around the hub axle, wherein the clutch is movable in the direction of a longitudinal axis of the hub axle for selecting a rotational force transmission path through the planetary gear mechanism and for selectively operating the transmission pawl. The clutch includes a first clutch member and a second clutch member capable of movement relative to each other in the direction of the axis of the hub axle. The first clutch member and the second clutch member move relative to each other in the direction of the axis of the hub axle when the drive member rotates in a first rotational direction for causing the transmission pawl to be in the first position for transmitting rotational motion between the ring gear and the hub body.

In another example, U.S. Pat. No. 5,581,136 discloses an auxiliary magnetic motor (AMM) [that] comprises a fixed ring formed of a multi-layer flat silicon steel plate with a plurality of coils formed thereon, the fixed ring being fixedly supported within a motor case. The AMM also comprises at appropriate positions on the fixed ring at least three Hall effect IC sensors for sensing and producing a switching sequence signal for the fixed ring. The motor case center connects to one end of the axle of the bicycle wheel to be driven. The AMM further comprises a flat rotating plate having an outer ring portion having formed thereon a plurality of magnetic elements. Matching speed sensor elements are appropriately located respectively on the motor case and the cover case to sense and feedback the rotational speed of the wheel to a programmable control circuit, so as to actuate a motor control circuit which provides a three phase signal to the fixed ring to magnetically actuate the rotation of the rotating plate, thereby driving the wheel through various linkages and a gear mechanism.

In another example, U.S. Pat. No. 5,069,304 discloses a reverse drive apparatus for a motorcycle is disclosed. The apparatus (10) includes a drive wheel (12) for releasably engaging a wheel (15) of the motorcycle (11). The drive wheel (12) is driven by an electric motor (16) which is powered by the motorcycle's battery. Support means (20) are provided for securing the electric motor (16) to a stationary portion, preferably the frame (22), of the motorcycle (11). The support means (20) include means for selectively moving the drive wheel (12) into and out of engagement with the driven wheel (15) of the motorcycle. This reference discloses an alternate means by which a reverse drive is added to a motorcycle, wherein an additional drive wheel is mounted to the motorcycle that is used to drive the rear wheel in reverse.

In another example, U.S. Pat. No. 5,024,113 discloses apparatus . . . for use in a vehicle having a forward motion transmission operatively connected between an engine and the output shaft connecting the drive wheel and a reverse drive mechanism arranged to be operatively connected to the output shaft for driving the vehicle in reverse. A speed change shift device is arranged to operate the forward motion transmission and the reverse drive mechanism so as to prevent simultaneous operation of the two apparatus.

In another example, U.S. Pat. No. 4,974,695 discloses a reverse drive mechanism for attachment to a motorcycle having two wheels, an engine and transmission for driving same in conventional fashion. The reverse drive mechanism has an electric motor which is separately energized and will, through slip coupling friction structure, drive a friction drive wheel engaged with the tire on the rear wheel of the motorcycle. Appropriate energizing and limit switches are associated with this reverse drive mechanism for safety and ease of use thereof.

In another example, U.S. Pat. No. 4,083,421 discloses a two speed motorcycle hub transmission in which the wheel may be driven at a one to one, or at a lower speed by a sliding clutch changing the drive from having the wheel locked to the drive shaft, to a planetary system the drive shaft driving the sun gear. This reference discloses one potential mechanism by which a planetary gear mechanism may be engaged and disengaged.

In another example, U.S. Pat. No. 3,908,483 discloses a power transmission incorporating planetary gearing with its sun gear connected to the input, and its internal gear connected to the output. An expansible inertia clutch comprising resilient means far absorbing shocks when reversing is incorporated between input and output. A brake is connected to the planet gear carrier and reversing is obtained by the application of said brake.

In another example, U.S. Pat. No. 2,414,832 discloses a reversing gear of the planetary type wherein a synchronizer is employed for both the clutching and the braking means.

In another example, U.S. Patent Application US20120028751 A1 discloses a shift mechanism for a transmission comprising a planetary gear transmission, a shift cam engaged with a planetary gear assembly in the planetary gear transmission, the shift cam having a shift cam stop, a rotatable cable ring connected to a moveable cable, the cable ring comprising a ramped portion, a rotatable ramped ring, the ramped ring comprising a ramped portion cooperatively engaged with the cable ring ramped portion, and further the ramped ring having a stop cooperatively engagable with the shift cam stop, a rotation of the cable ring urges the ramped ring a predetermined distance in a direction normal to the plane of rotation of the cable ring, the shaft cam held against rotation by engagement with the ramped ring, and at which predetermined distance the ramped ring is allowed to rotate with the cable ring simultaneous with the axial movement of the ramped ring, and a spring connected between the cable ring and the shift cam, the shaft cam reacting to the spring force rotates upon rotation of the ramped ring by an amount of rotation that is limited by engagement of the shift cam stop with the ramped ring stop and during which rotation of the shaft cam the transmission shifts gears.

In another example, U.S. Patent Application US20100267508 A1 discloses a direct drive electric shift two speed planetary gearbox using a linear actuator to engage selectively the ring gear either to the housing or to the carrier by means of a synchronizing clutch to provide a low speed mode, a neutral mode, and a high speed mode of operation resulting in significant fuel efficiencies.

The reverse gear mechanisms provided in the foregoing examples are complicated, expensive, introduce new components, and/or have a negative effect on the forward operation of the drive. For example, U.S. Pat. No. 8,001,862 B2 introduces a transmission modification. U.S. Pat. No. 7,952,305 B2 introduces a separate electric motor that is used to provide reverse power. Only one reference, U.S. Pat. No. 7,311,636 B1 (the '636 Patent"), discloses replacing the existing sheave or sprocket with a replacement that is connected to a planetary gear mechanism for providing reverse power. However, the '636 Patent teaches a device, in two different embodiments, that is implemented by "locking" and "unlocking" the planetary gear mechanism. With the '636 Patent, the idea is to "lock" the planetary gear mechanism such that the sun gear, planet gears and outer ring gear are all locked with respect to each other and function as one single wheel delivering rotational force in the forward direction. In the unlocked position, the planet gears are free to rotate such that the sun gear rotates opposite to the outer ring gear delivering opposite rotational force. Operationally, the sun gear is mechanically attached to the wheel and is thus always required for operation, either forward or reverse. The only difference is whether the sun gear is free to move independent of the planet gears or not. The device of the present invention does not contemplate this operation. The device of the present invention teaches a shuttle system allowing the user to choose which gear package, the forward or the reverse, is in use at any one time. When in normal forward mode, the operation does not involve the planetary gear assembly at all. In reverse mode, the planet gears merely rotate with respect to each other to allow the outer ring and sun gear to rotate opposite providing reverse force when the sun gear becomes operationally connected, but not directly connected to the hub through the shuttle mechanism. It will be appreciated by one of skill in the art, that this simple shuttle mechanism, and the ability to choose which gear package to implement, and the idle nature of the reverse gear mechanism when not in use is a significant improvement over the prior art with many distinct advantages. For example, in the present invention, there is no planet gear "locking" mechanism required to deliver normal forward rotational force that will inherently create friction and drag reducing gas mileage and power and creating parts that will wear and need replacement just to continue normal operation in the forward direction. Moreover, it will be appreciated by those with skill in the art, the potential negative effects such a locking mechanism may have on the stability of operation when sudden reduction of transmission power is effected by such maneuvers as removing all throttle when going downhill or sudden braking, and the like. Additionally, since the sun gear is never directly connected to the hub or wheel and is only in use and operationally connected during reverse operation, unnecessary wear and tear on the central power reversing component, i.e., the planetary gear package, is avoided.

Thus, all of the disclosed references provide devices that are complicated, expensive, introduce extra components, impede the normal existing operation of the drive power, and/or create instability in some typical normal operation of the power of the device to which it is attached creating potentially dangerous situations, and as such, fail to provide a suitable reverse drive mechanism that is reliable, inexpensive, simple, simple to install, and does not affect the normal existing forward power of the existing drive in any way. Therefore, there exists a need to provide a reverse mechanism that is reliable, inexpensive, simple, simple to install and does not have any effect, either in reducing gas mileage, power, wearability, safety, or any other negative effect on the existing forward power to the drive.

The present invention solves the problems encountered in the art by providing a device that attaches to a hub of a drive mechanism that teaches a shuttle mechanism that sequentially disengages a forward drive power and then, and only then, engages a planetary gear package which results in a reverse output of power to the drive mechanism. It is to be appreciated that the device of the present invention teaches a reverse gear package that is blind to the normal operation of the drive. That is, when not engaged, the planetary gear components are not moving or operationally connected in any way to the forward drive components and cannot possibly have any negative effects. The vehicle to which the device of the present invention is attached does not require any modification beyond replacing the hub attachment as specifically and described in detail herein and adding a means to engage and/or disengage the planetary gear package. Since the outer pulley interface exactly mirrors the original pulley interface which it replaces and transfers force and RPM's to the hub mounting plate in exactly the same way as it provided prior to installation of this device, operationally, the forward drive power of the original configuration is maintained.

SUMMARY

In general, the device of the present invention provides a replacement for an existing drive pulley that maintains the same connection with the drive belt or chain or other drive force delivering mechanism and further provides an internal mechanism that when engaged, and only when engaged, provides reverse power to the axle through the connected hub adapter plate.

One skilled in the art will appreciate that the mechanism taught in the present invention can be applied very easily to any powered drive that supplies its power through a drive wheel, which can be powered through, for example and without limitation, a belt driven pulley, a chain driven sprocket, a v-belt driven sheave or a direct driven gear wheel by modifying the drive wheel to be fitted with the appropriate size internal components as disclosed herein. For sake of clarity and no limitation should be read as a result, the description of the drawings and detailed description below will be made with reference to application to a motorcycle with a nylon belt driven wheel assembly.

The following specific definitions are for terms as used throughout this specification:

"Gear Package" means any assembly of plates having an at least one mating connection to the pulley mounting plate, an at least one mating connection to the hub mounting plate, and any number of other plates that provide the ability to transfer directional force from the pulley through to the hub, said any number of other plates either transferring the same direction of force as the pulley or providing a reversal of the direction of force from the pulley.

"Reverse Gear Package" means a gear package wherein said any number of other plates includes a planetary gear assembly.

"Shuttle Mechanism" means the device more fully described herein that is capable of movement along a shuttle to allow one gear package to engage a mating plate while disengaging another gear package from said mating plate and then capable of reversing that process.

"Pulley Drive" means the drive wheel of an existing device that receives power from an existing power source such that the drive wheel then transfers the power delivered by the power source to an axle of the existing device.

"Actuator Assembly" means any device capable of is capable of engagement and disengagement by a person that is then capable of exerting appropriate inward pressure on the outside of the reverse shuttle plate and release of such pressure as more fully described herein.

"Mating Plate" means a plate that is capable of securely engaging with and disengaging from another plate such that when engaged and the mating plate turns, said other plate will necessarily turn, and when disengaged, when said mating plate turns it will have no effect on said other plate.

"Hub Mounting Plate" means a plate that is capable of securely mounting to the hub of an existing device.

"Planet Gear Assembly" means a device of planet gears that comprises at least one outer ring gear, a plurality of planet gears and at least one sun gear such that when in operation, said at least one sun gear rotates in an opposite direction to the at least one outer ring gear.

"Plate" means any substantially circular mechanical component capable of rotation and forming and/or serving as a component part of the invention described herein.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person of ordinary skill in the art to make and use the invention. Throughout all of the drawings, like reference numbers indicate identical or functionally equivalent elements. A more complete appreciation of the invention and many of the attendant advantages thereof will be readily obtained as the same becomes better understood by reference to the following detailed description when considered in connection with the accompanying drawings, wherein:

FIG. 19A depicts the pulley (1) as embodied in the preceding figures. FIGS. 19B, 19C and 19D (components (101) (201) and (203) respectively) depict embodiments involving a chain driven sprocket similar in size to the current embodiment (101), a chain driven sprocket smaller in size to the current embodiment (201), and a v-belt driven pulley similar in size to the current embodiment (203). These examples should not limit the current invention to only these configurations but are given merely to demonstrate that the device of the present invention is adaptable to many alternate pulley configurations.

DETAILED DESCRIPTION

Figure 1:
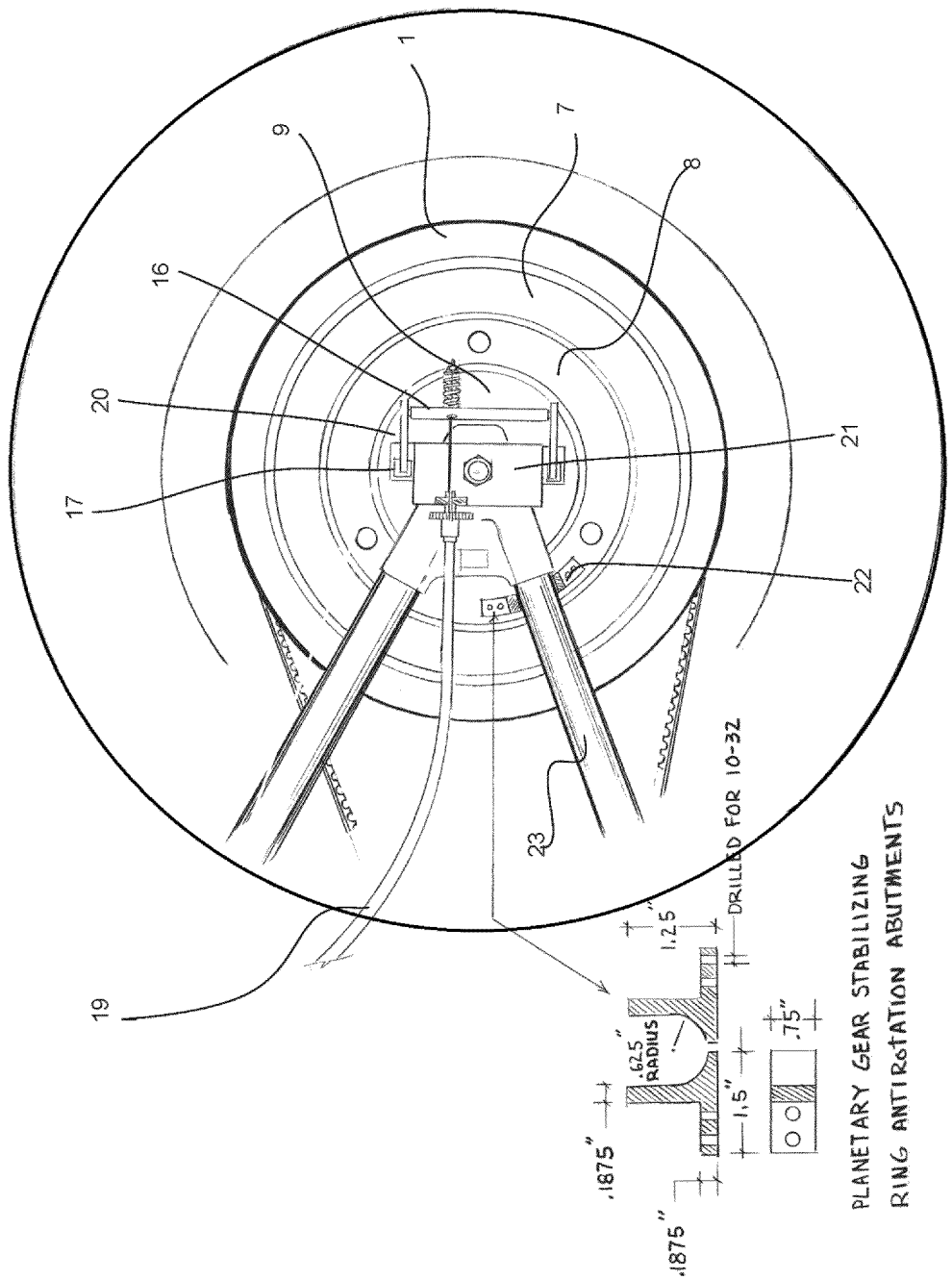
FIG. 1 depicts a view of the outside of a wheel and swingarm of a motorcycle as one embodiment of the device of the present invention attached thereto, showing one embodiment of an actuator assembly (21) that engages and disengages the device of the present invention through a tension cable (19) that when pulled, moves a lever (16) forcing its tabs (20) to move the engagement prongs (17) a sufficient distance, in the current embodiment 9/32", to contact the engagement plate (9) (which is the outer surface of the reverse shuttle plate (9A)) via contact with the engagement wheels (18) (see FIG. 2) forcing the engagement plate (9) to move a like distance inward and move the device into the reverse engaged position (detailed in FIG. 5) and also depicting the planetary gear stabilizing system (22) that connects the swing arm (23) to the planetary gear stabilizer ring (8).
Figure 2:
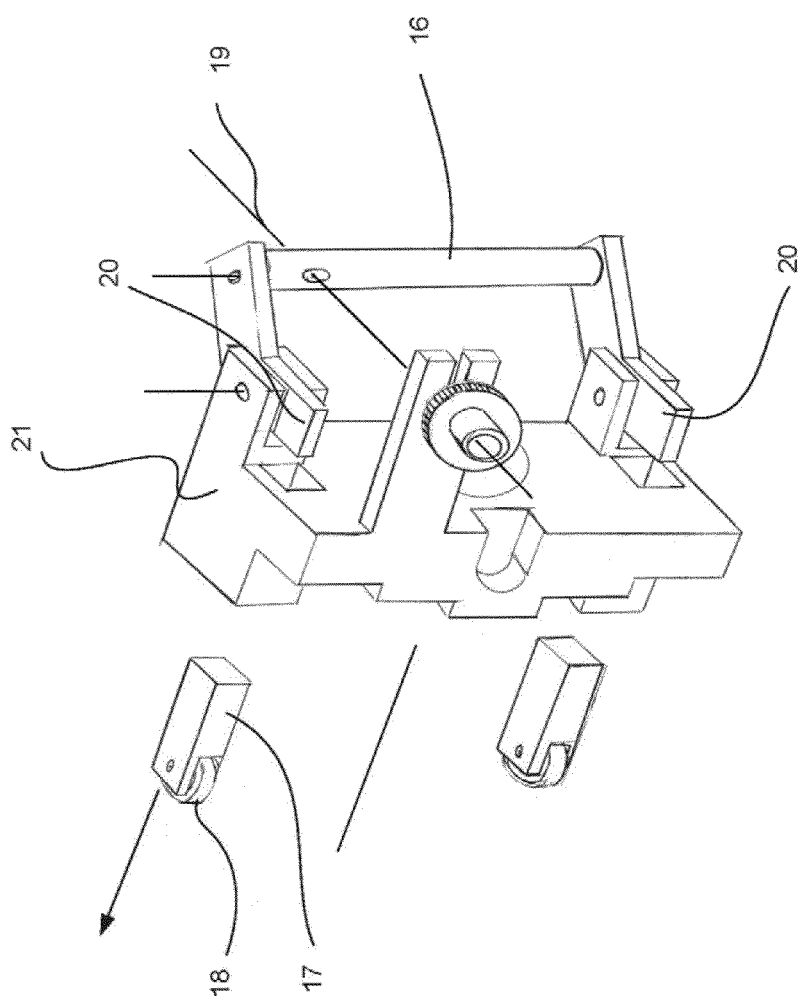
FIG. 2 depicts an exploded view of the actuator assembly (21) and its constituent parts, the moving lever (16), the tabs (20) which contact the engagement prongs (17) with friction reducing wheels (18) and the tension cable (19).

For clarity of disclosure, and not by way of limitation, the detailed description of the invention is divided into the following subsections that describe or illustrate certain features, embodiments or applications of the present invention.

The Actuator Assembly

It will be appreciated by one skilled in the art that any actuator assembly that is capable of exerting appropriate inward pressure on the outside of the reverse shuttle plate (9A) and thereby moving the assembled reverse gear package to engage the rear wheel reverse plate (5) (or (32) or some other embodiment) into the pulley mounting plate (4) after disengaging the forward shuttle plate (3) from the pulley mounting plate (4) is suitable for use in the device of the present invention.

In one embodiment of the present invention, a generic hand lever pulled tension cable device as would be used for example, for actuating the brakes on a typical bicycle, with the hand lever mounted on the handlebars of a motorcycle and the cable fed along the frame of the motorcycle with the cable end fed into a lever (16) of the actuator assembly (21), which when pulled, would move the lever (16) is suitable for use in the device of the present invention.

One example of such an actuating lever is the actuator lever sold as the Kawasaki® Lever Assembly Part No. 46076-1225.

It will be appreciated by one skilled in the art that an electronic actuating device may be used in one embodiment of the device of the present invention. In another embodiment, a hydraulic actuating device may be used. In another embodiment, a motorized actuating device may be used. It should be noted that any suitable device may be used that can exert sufficient, sustained inward pressure to the outside surface of the reverse shuttle plate (9A) and thereby moving all other components as described herein an appropriate distance to disengage the forward shuttle plate (3) from the pulley mounting plate (4) and then engaging the rear wheel reverse plate (5) (or (32) or some other embodiment) into the pulley mounting plate (4) and when released, will allow the force of the disengagement springs (11) to move the reverse gear package to disengage the reverse wheel plate (5) from the pulley mounting plate (4) and then the forward shuttle plate (3) to engage into the pulley mounting plate (4) with the actuator assembly (21) and in particular the engagement prongs (17) withdrawing from contact with the outside surface of the reverse shuttle plate (9A).

The Shuttle Mechanism

It will be appreciated by one skilled in the art that the interplay within the shuttle mechanism, the forward shuttle plate (3), the reverse shuttle plate mechanism (9A), (9B) and (14), and the shuttle (15) perform the essential tasks of one embodiment of the device of the present invention, being the engagement and disengagement of the reverse gear mechanism.

Figure 3:
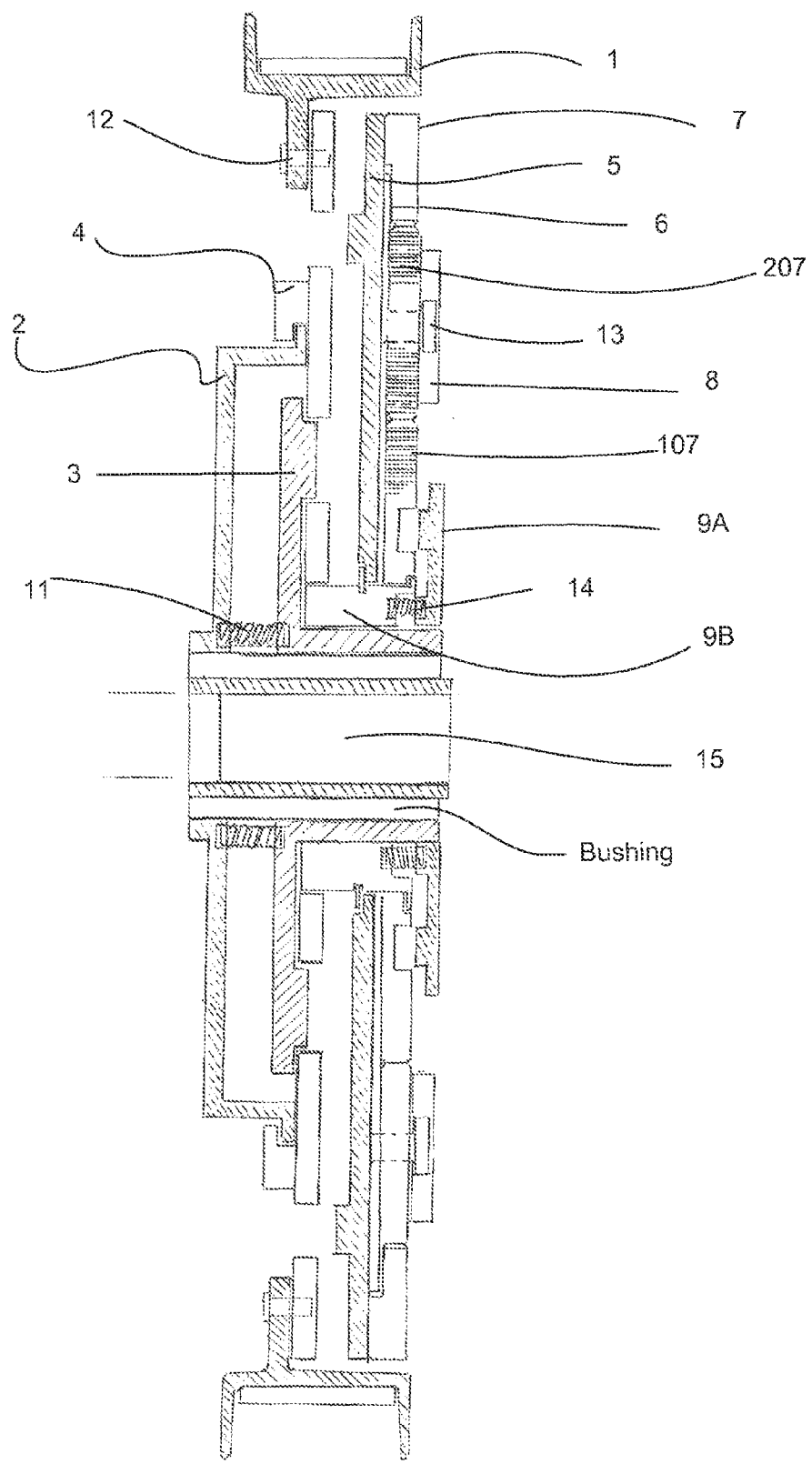
FIG. 3 depicts a slice view of one assembled embodiment of the device of the present invention in the disengaged position that results in normal forward operation of the device to which it is attached showing the forward shuttle plate (3) engaged into the pulley mounting plate (4) which is permanently affixed to the pulley (1) via screws (12) as a result of the pressure delivered by the disengagement springs (11) and the hub mounting plate (2) and the reverse gear package consisting of the rear wheel reverse plate (5), the planetary gear anchor plate (6), the planetary gear assembly (7) (107) and (207), the planetary gear stabilizer ring (8) and the reverse shuttle plate mechanism (9A)(9B) and (14), completely disengaged from the pulley mounting plate (4).

When in the disengaged position, as shown in FIG. 3, the forward shuttle plate (3) is coupled to the pulley mounting plate (4) as a result of the force exerted by the disengagement springs (11) between the hub mounting plate (2) and the forward shuttle plate (3). The force exerted can be any force suitable for coupling the forward shuttle plate (3) to the pulley mounting plate (4). In one embodiment, the force is 90 inch pounds of pressure per disengagement spring (11). In this mode, the reverse gear package, except for the reverse shuttle plate mechanism (9A) (9B) and (14), is completely disengaged from the pulley mounting plate (4) and therefore does not interfere with the forward drive components in any way. The shuttle (15) is engaged into the hub mounting plate (2) and the forward shuttle plate (3) and the reverse shuttle plate mechanism (9A) (9B) and (14). When the belt drive exerts rotational force on the pulley (1), that force is transferred to the pulley mounting plate (4) which in turn rotates the forward shuttle plate (3) which in turn transfers rotational force to the shuttle (15), which in turn directs forward rotational force through the shuttle (15) and to the hub mounting plate (2) which is bolted to the wheel hub and rotates the wheel as originally intended by normal operation of the motorcycle.

Figure 4:
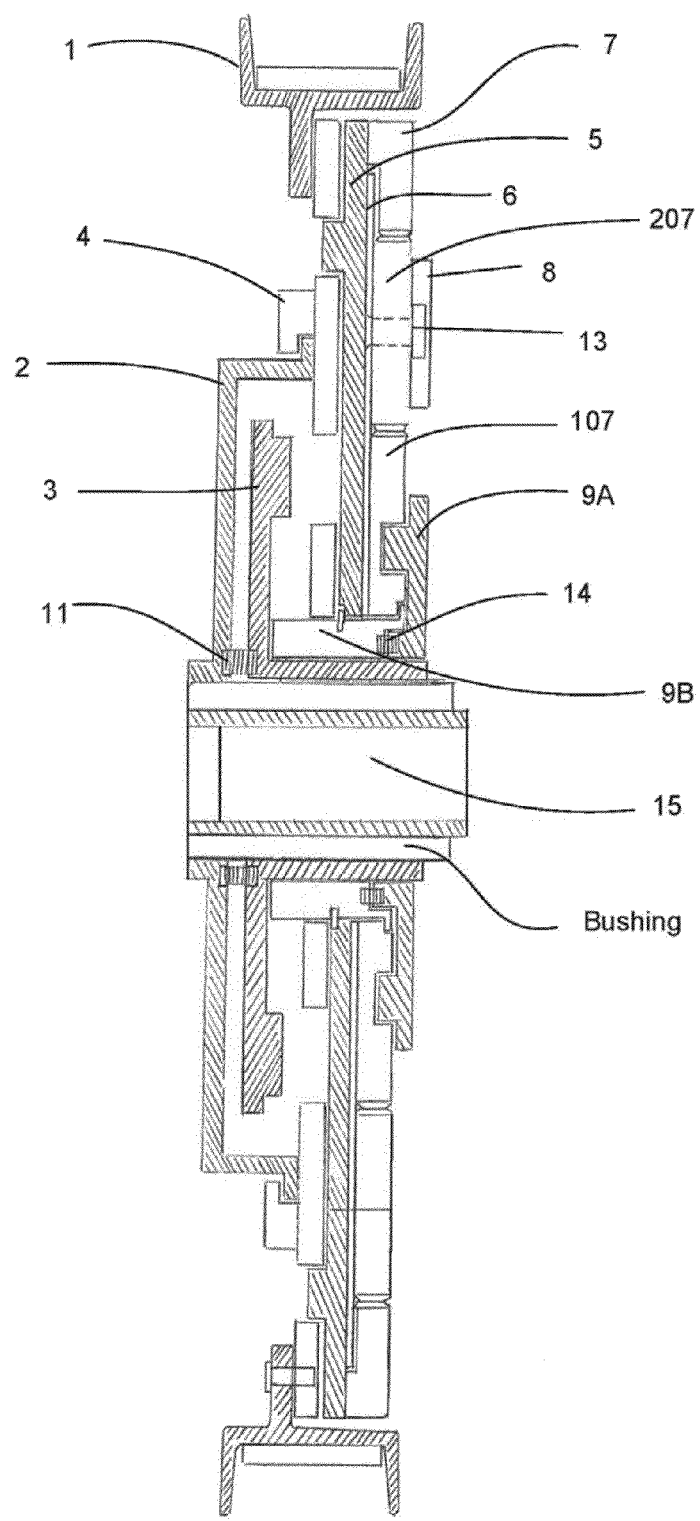
FIG. 4 depicts a slice view of one assembled embodiment of the device of the present invention in the engaged position that results in reversing the normal forward operation of the device to which it is attached showing the rear wheel reverse plate (5) of the reverse gear package consisting of the rear wheel reverse plate (5), the planetary gear anchor plate (6), the planetary gear assembly (7)(107) and (207), the planetary gear stabilizer ring (8) and the reverse shuttle plate mechanism (9A)(9B) and (14) engaged with the pulley mounting plate (4) and the forward shuttle plate (3) disengaged from the pulley mounting plate (4) as a result of the inward movement of the reverse shuttle plate assembly (9A)(9B) and (14) forcing the forward shuttle plate (3) inward (compressing the disengagement springs (11)) and releasing from the pulley mounting plate (4)).
Figure 5:
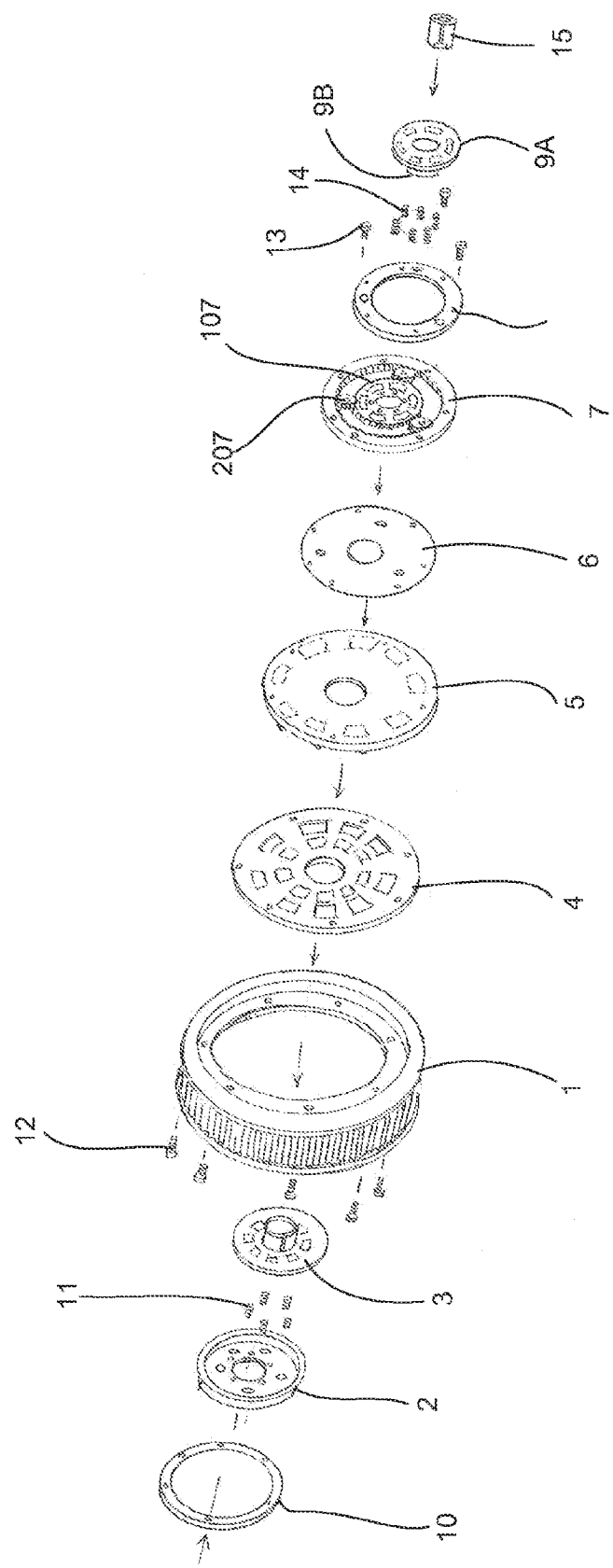
FIG. 5 depicts an exploded view of one embodiment of the device of the present invention, showing the pulley (1), the hub mounting plate (2), the forward shuttle plate (3), the pulley mounting plate (4), the rear wheel reverse plate (5), the planetary gear anchor plate (6), the planetary gear assembly (7) (107) and (207), the planetary gear stabilizer ring (8), the reverse shuttle plate mechanism (9A) (9B) and (14), (the pieces 5-8, 9A, 9B, 107, 207 and 14 known as the reverse gear package), the pulley retainer ring (10), the disengagement springs (11), the pulley mounting plate screws (12), the planetary gear stabilizer ring mounting screws (13), the reverse gear package stabilizer springs (14), and the drive shuttle (15).
Figure 6:
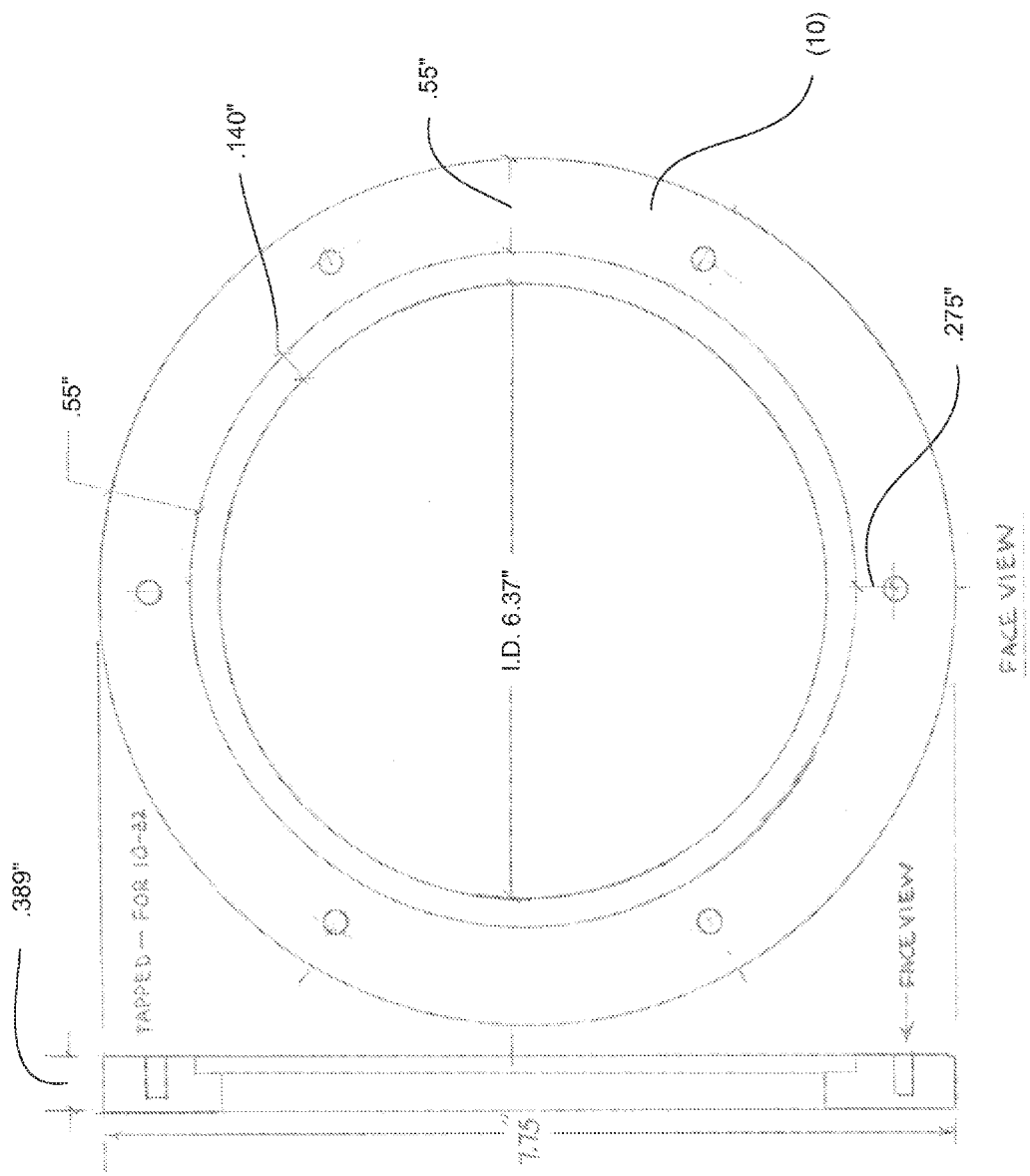
FIG. 6 shows two views of one embodiment of a pulley retaining ring (10) suitable for use in the device of the present invention.
Figure 7:
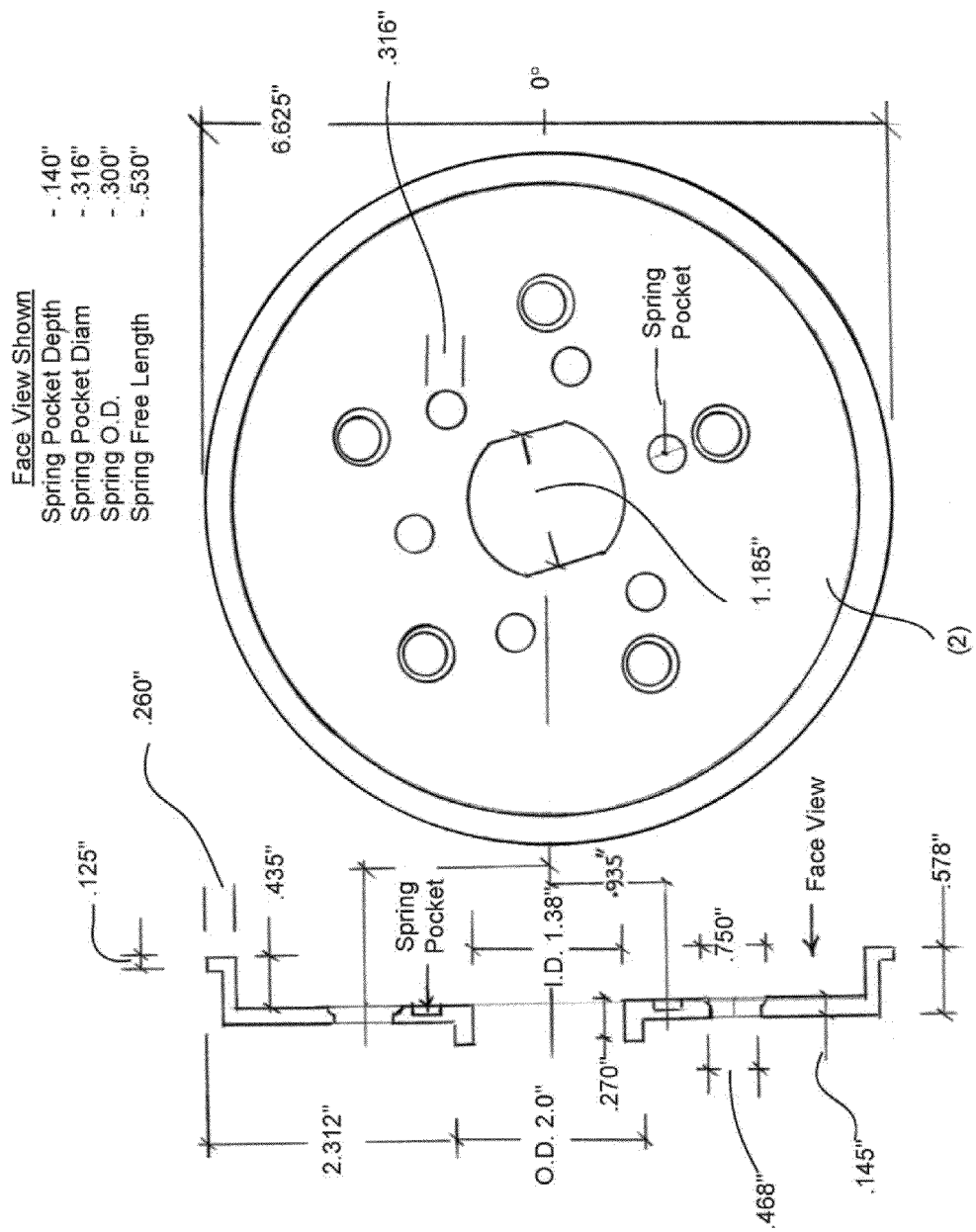
FIG. 7 shows two views of one embodiment of a hub mounting plate (2) suitable for use in the device of the present invention.
Figure 8:
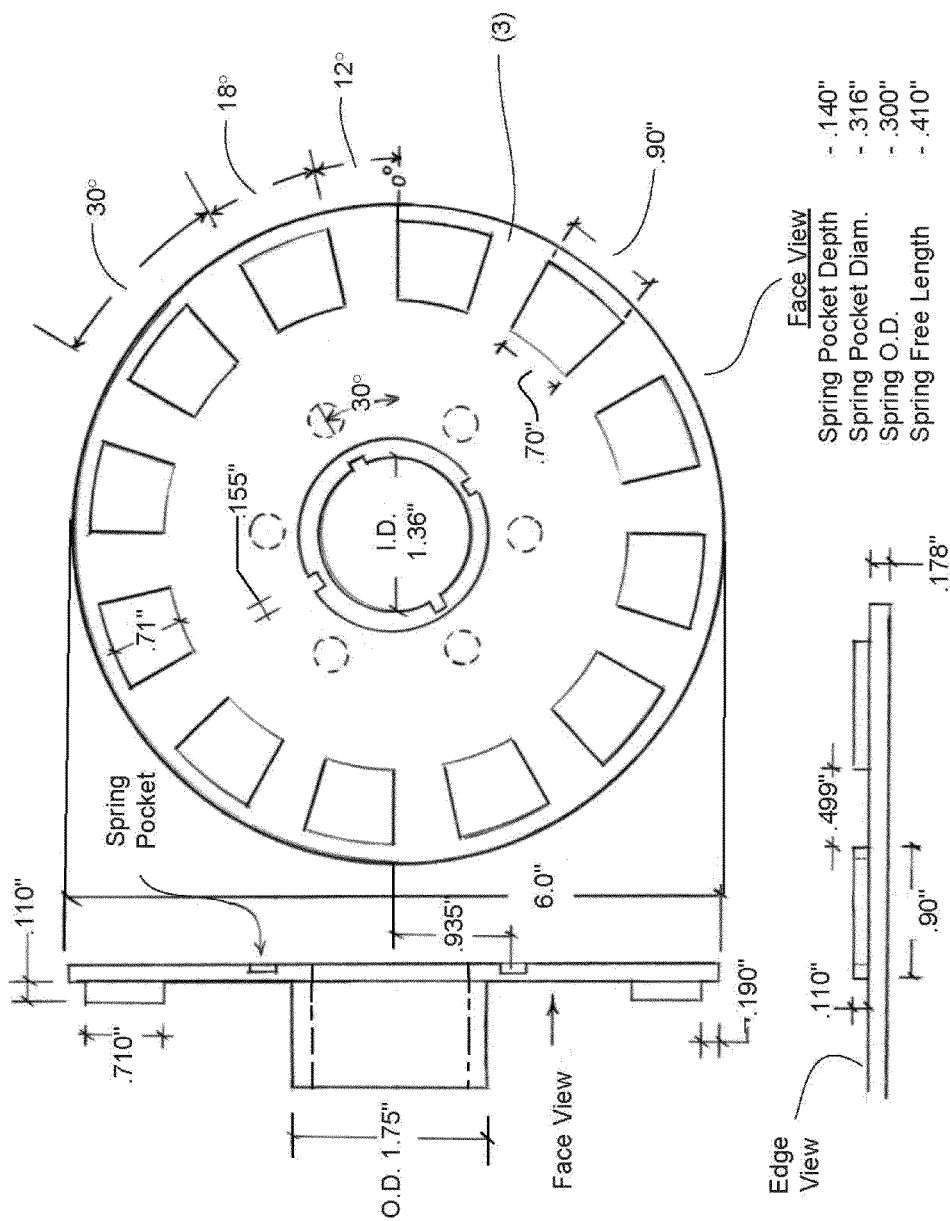
FIG. 8 shows two views of one embodiment of a forward shuttle plate (3) suitable for use in the device of the present invention.
Figure 9:
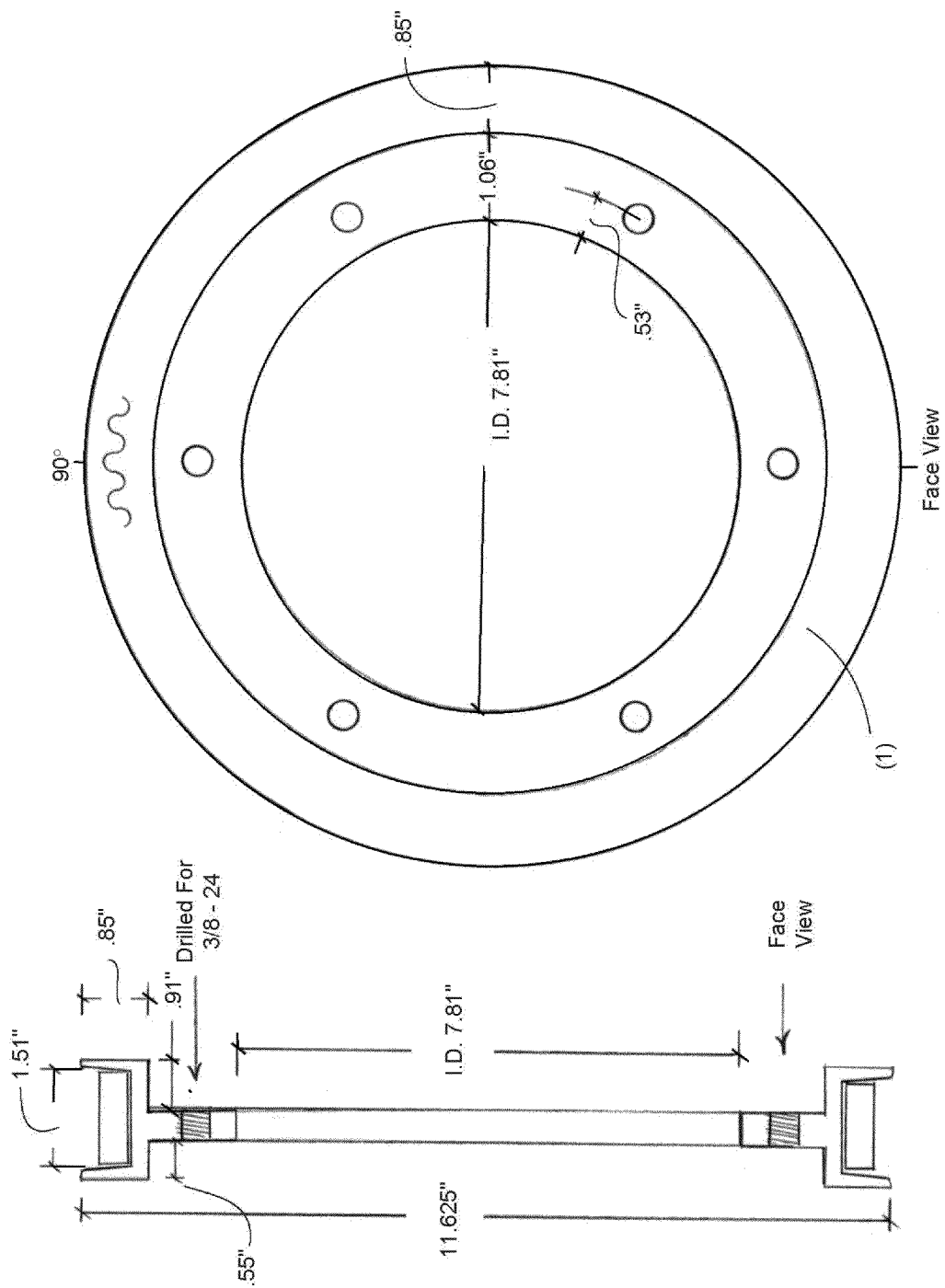
FIG. 9 shows two views of one embodiment of a pulley (1) suitable for use in the device of the present invention.
Figure 10:
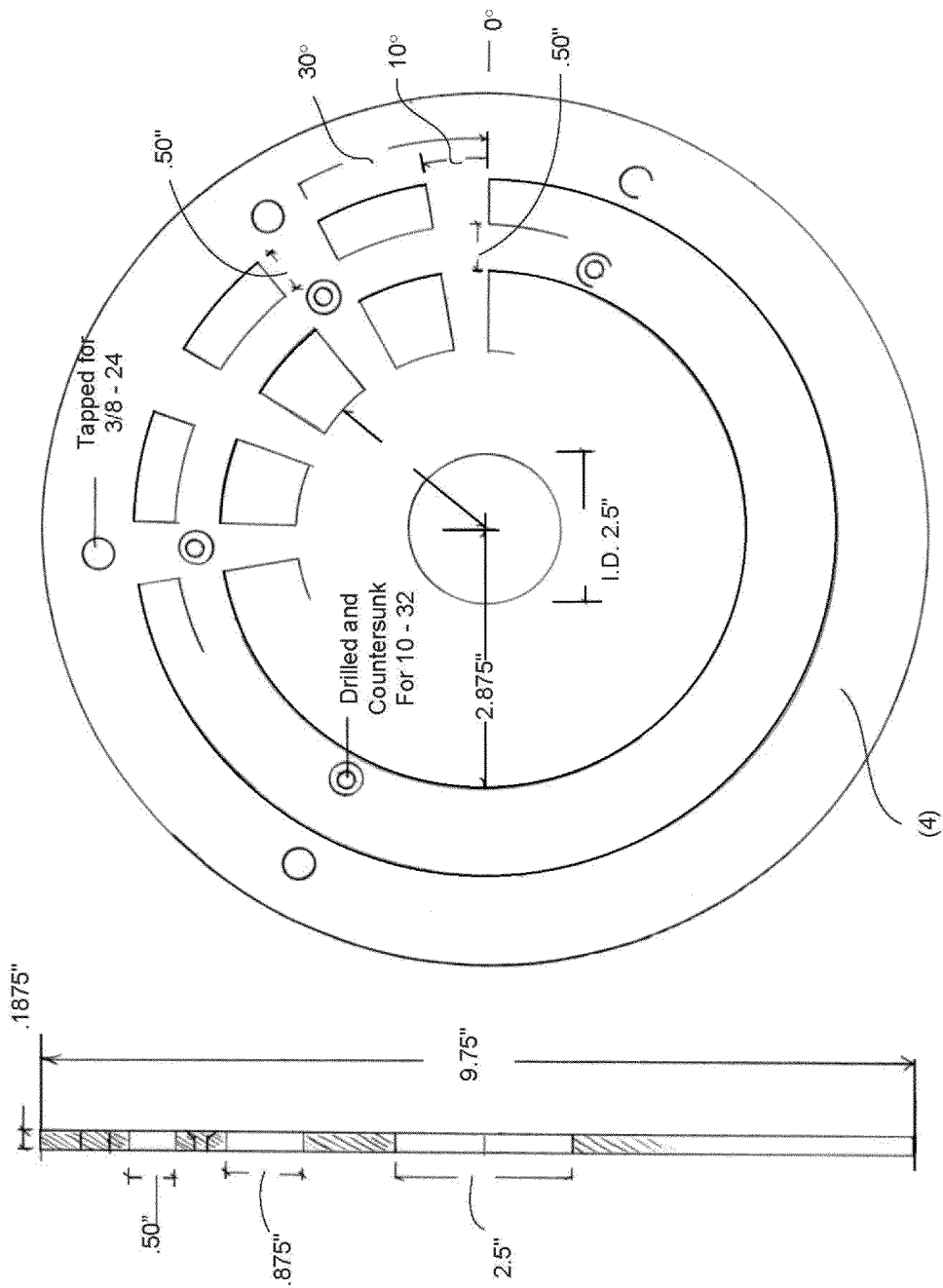
FIG. 10 shows two views one embodiment of a pulley mounting plate (4) suitable for use in the device of the present invention.
Figure 11:
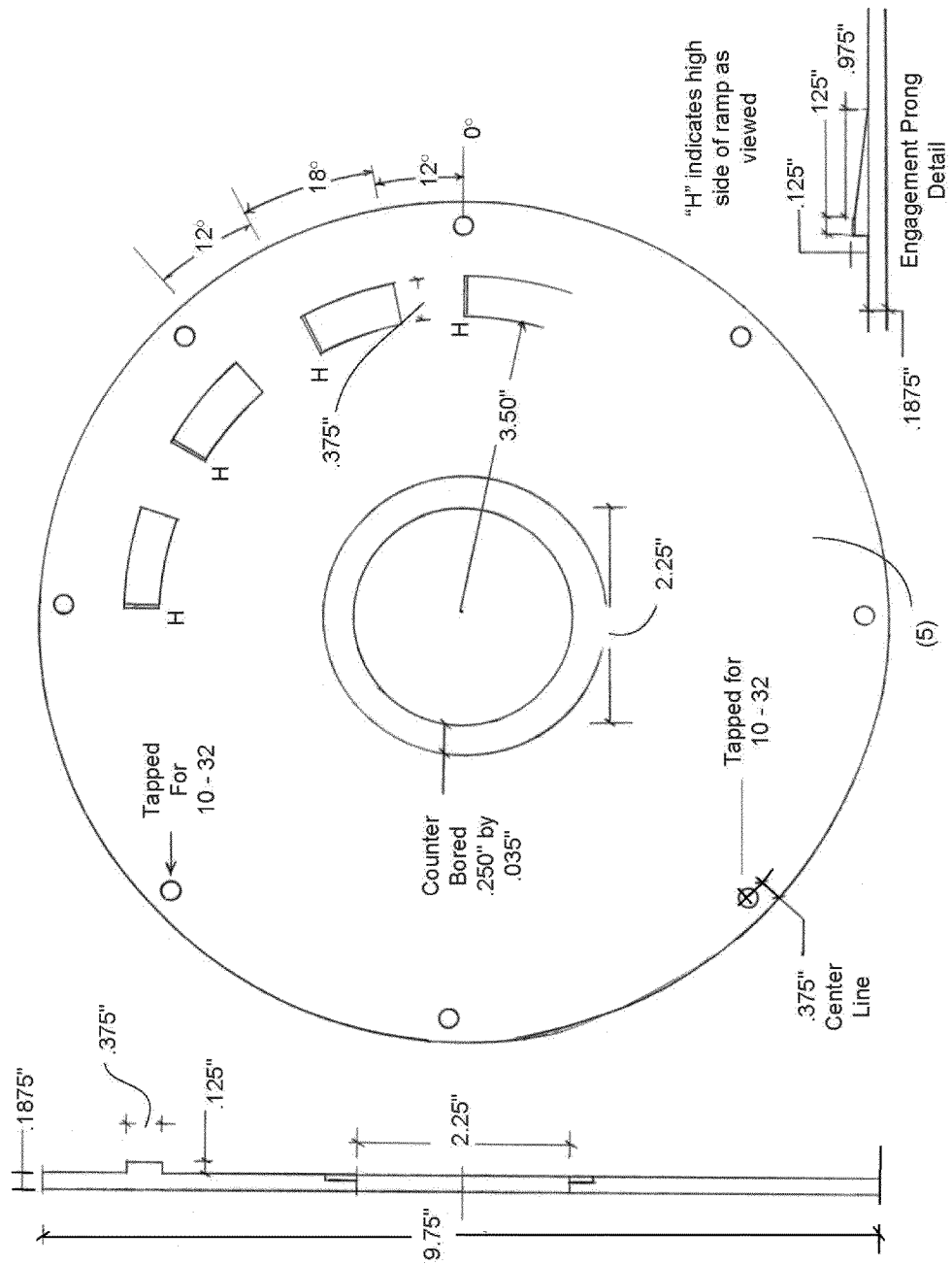
FIG. 11 shows two views of one embodiment of a rear wheel reverse plate (5) suitable for use in the device of the present invention.
Figure 12:
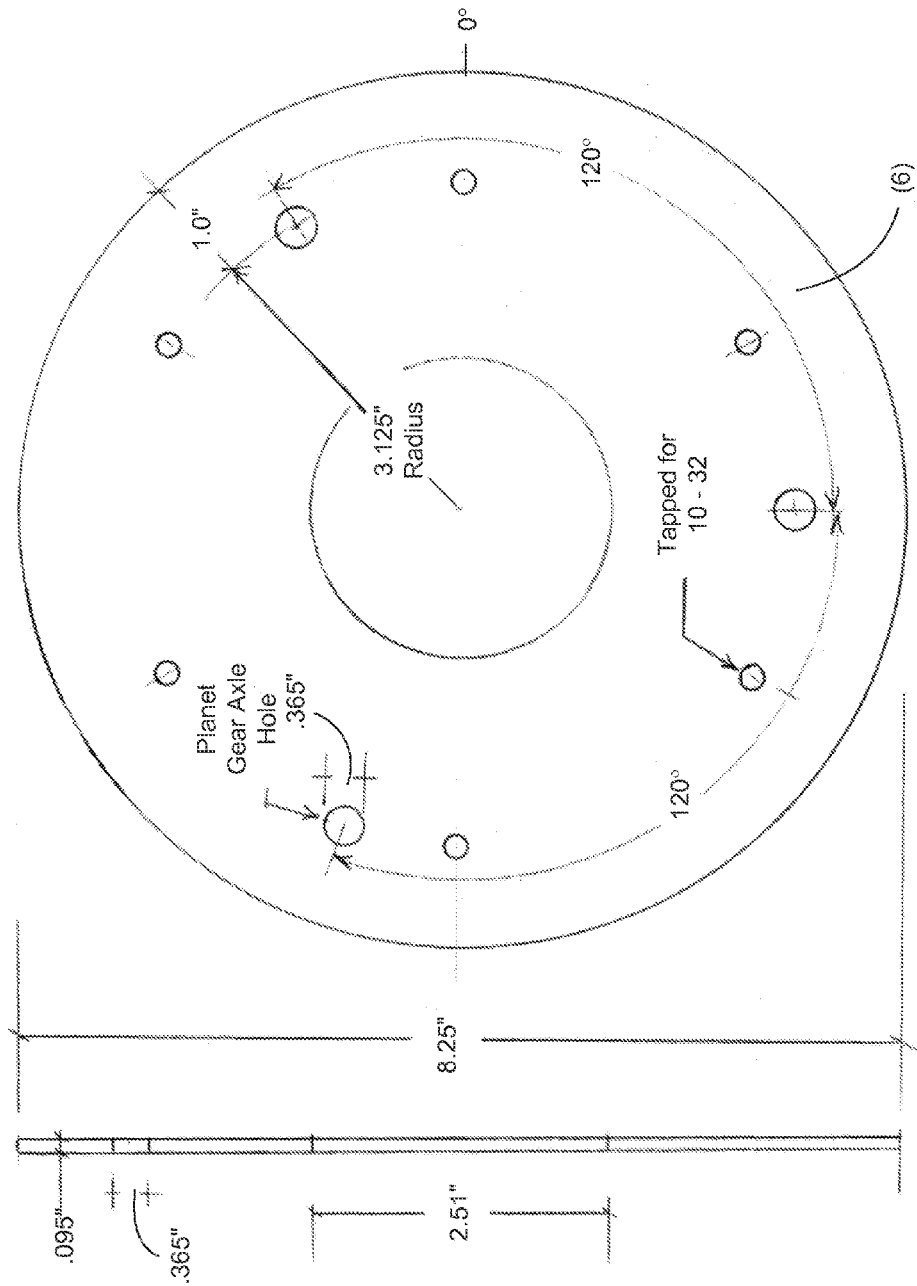
FIG. 12 shows two views of one embodiment of a planetary gear anchor plate (6) suitable for use in the device of the present invention.
Figure 13:
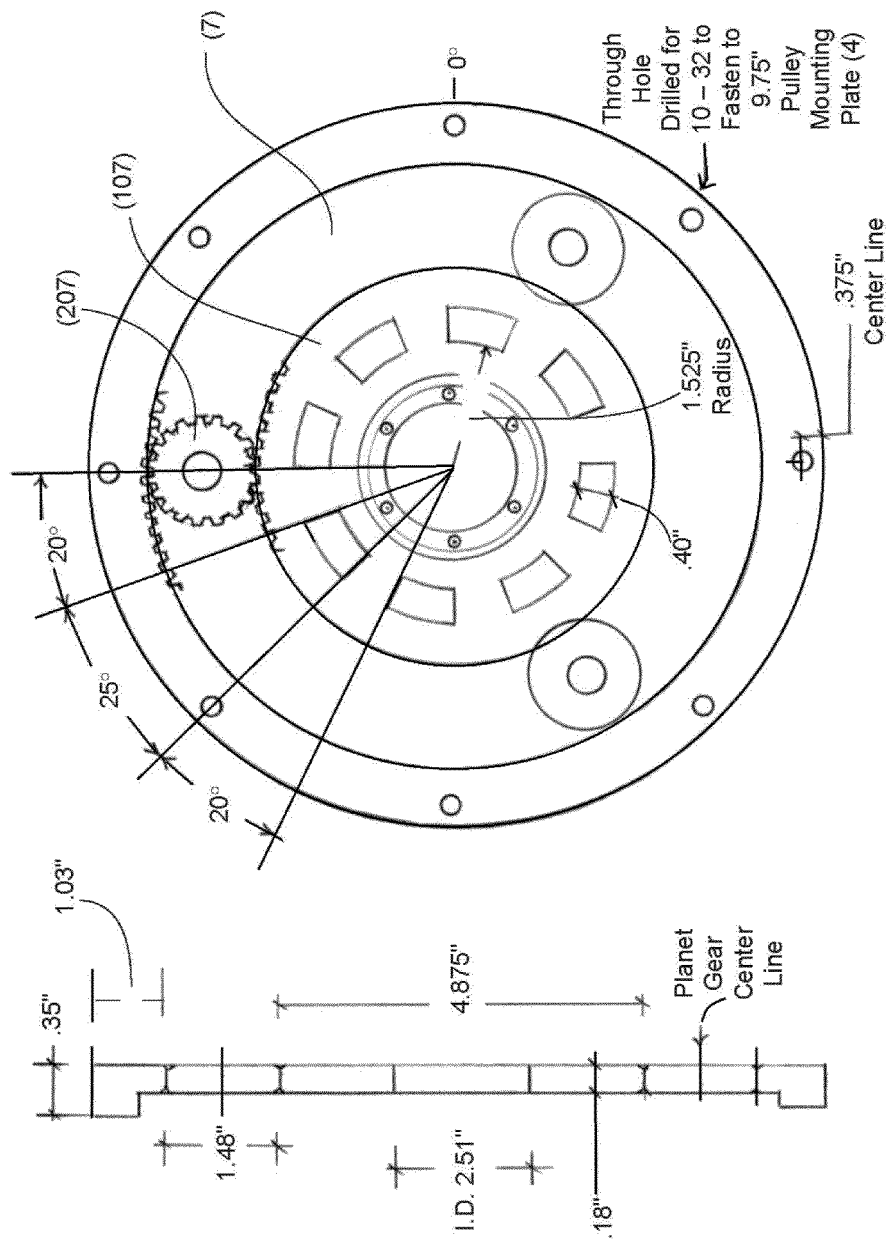
FIG. 13 shows two views of one embodiment of a planetary gear assembly (7) (107 and (207) suitable for use in the device of the present invention.
Figure 14:
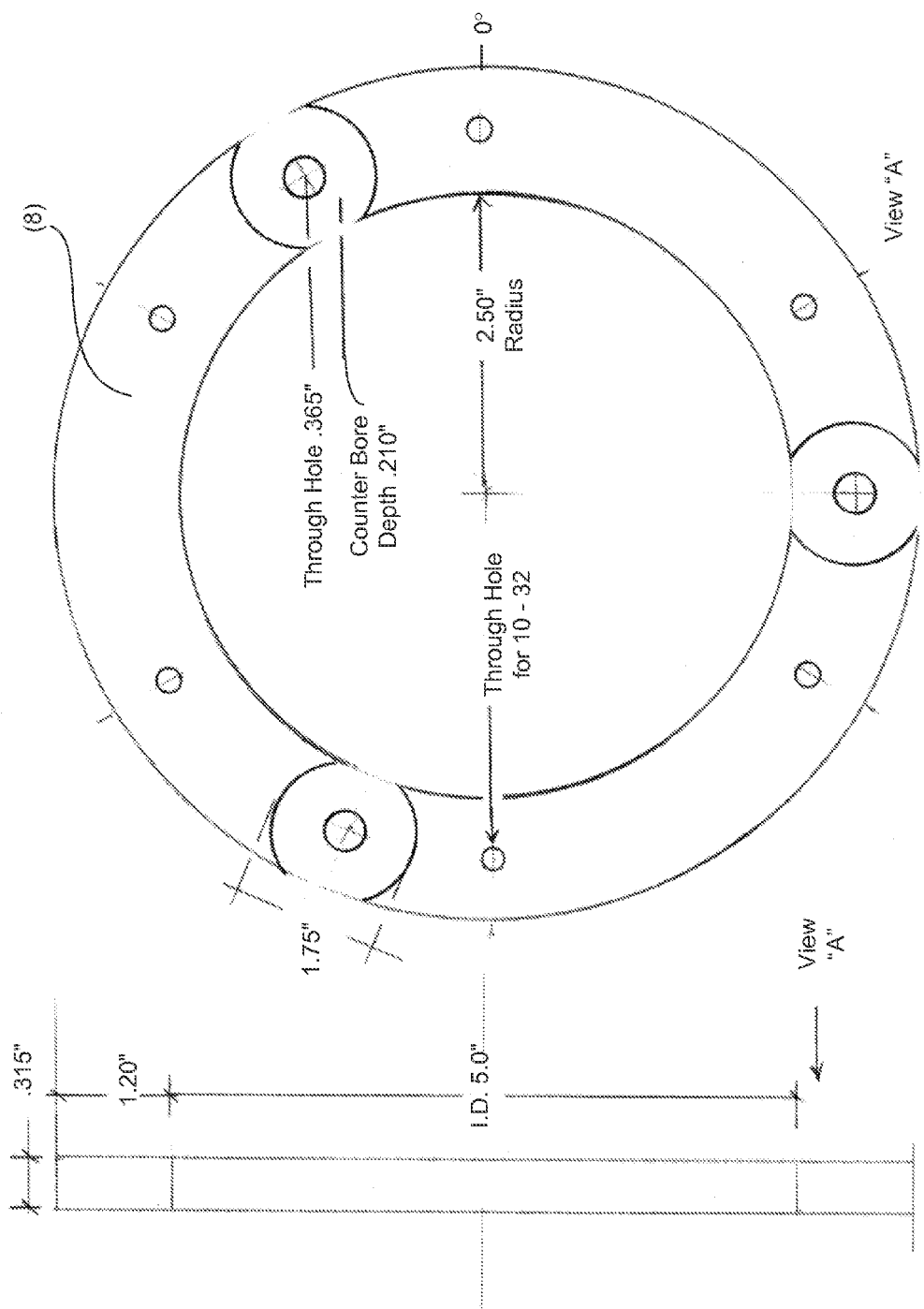
FIG. 14 shows two views of one embodiment of a planetary gear stabilizer ring (8) suitable for use in the device of the present invention.
Figure 15:
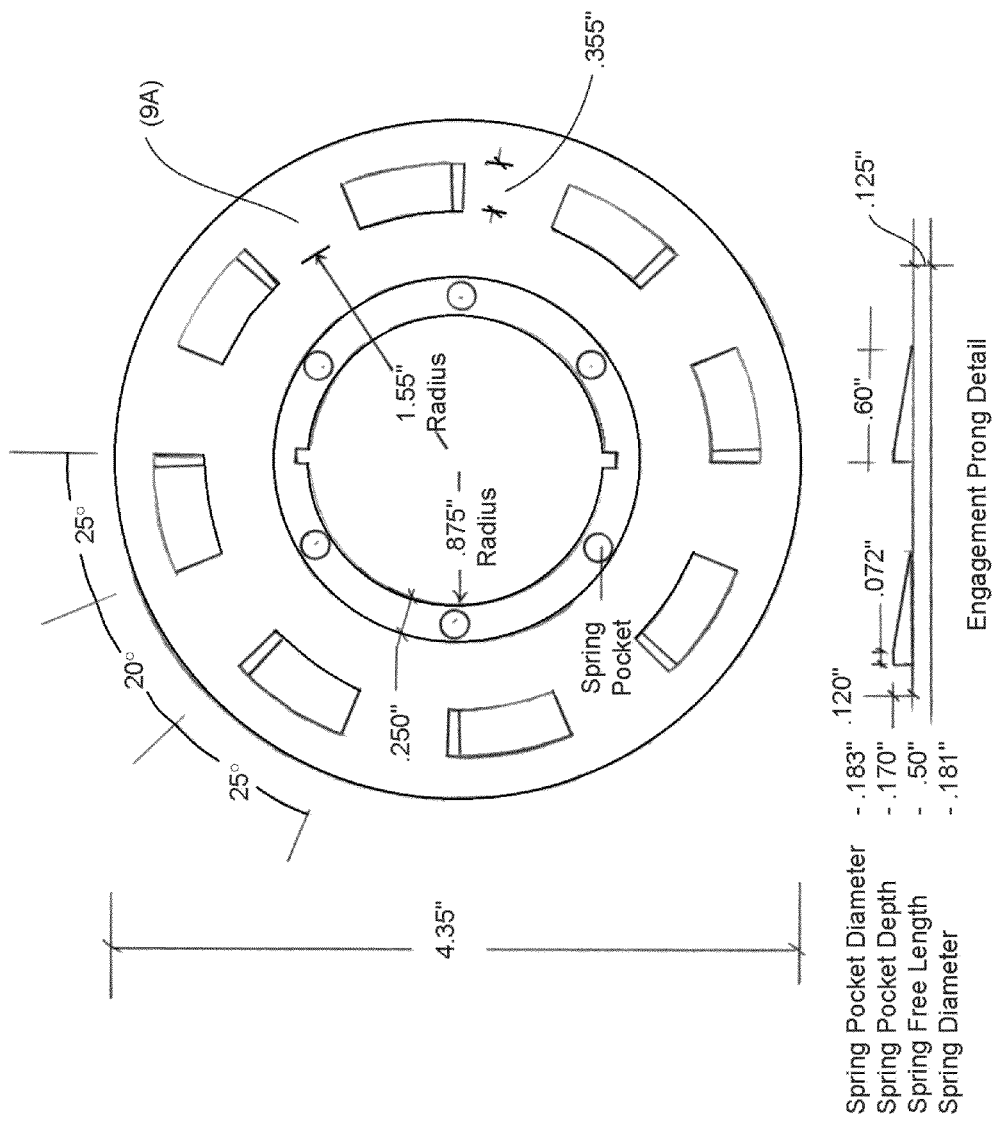
FIG. 15 shows two views of one embodiment of the reverse shuttle plate (9A) suitable for use in the device of the present invention.
Figure 16:
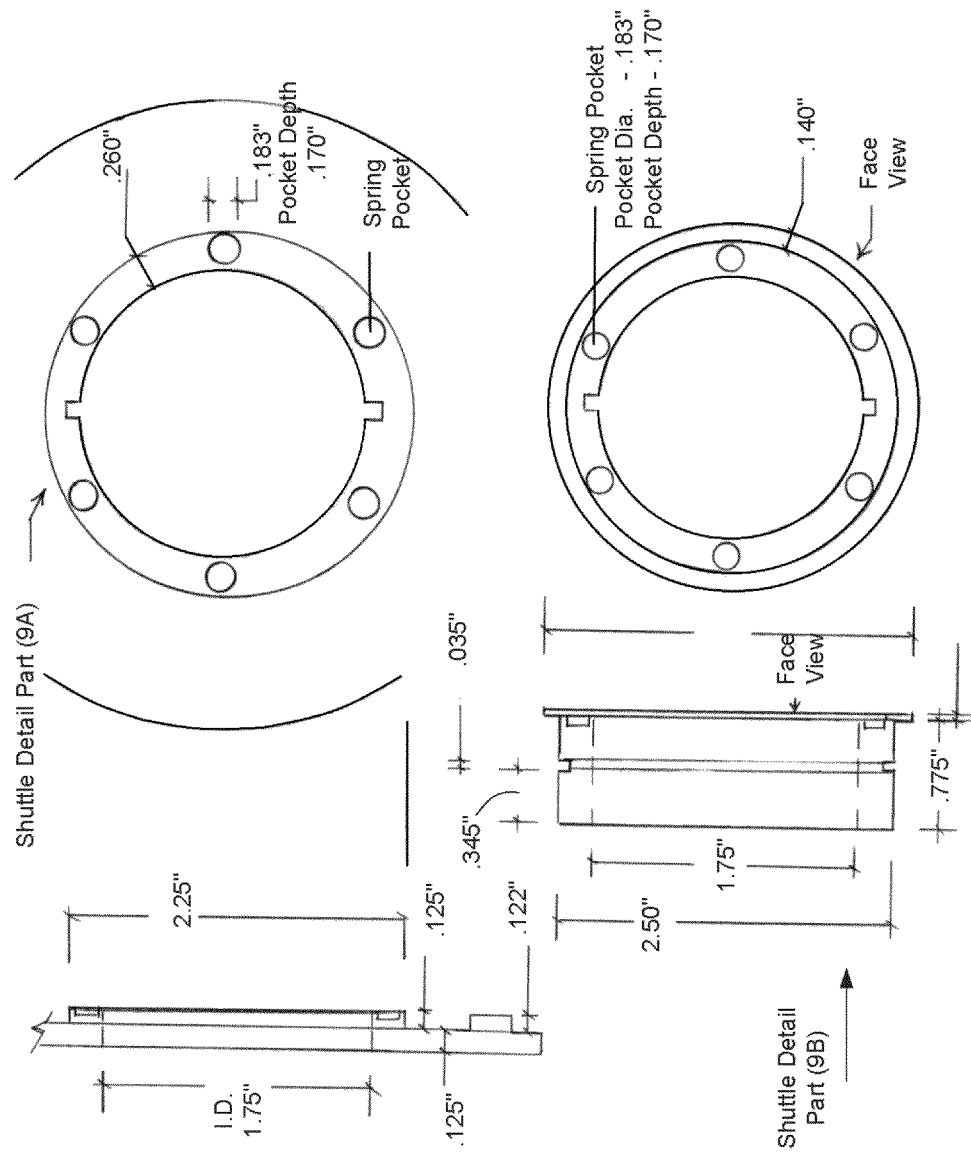
FIG. 16 shows two views of one embodiment of the reverse shuttle plate (9A) and two views of the corresponding part of the same embodiment (9B) depicting the spring pocket detail and the extension detail, suitable for use in the device of the present invention.
Figure 17:
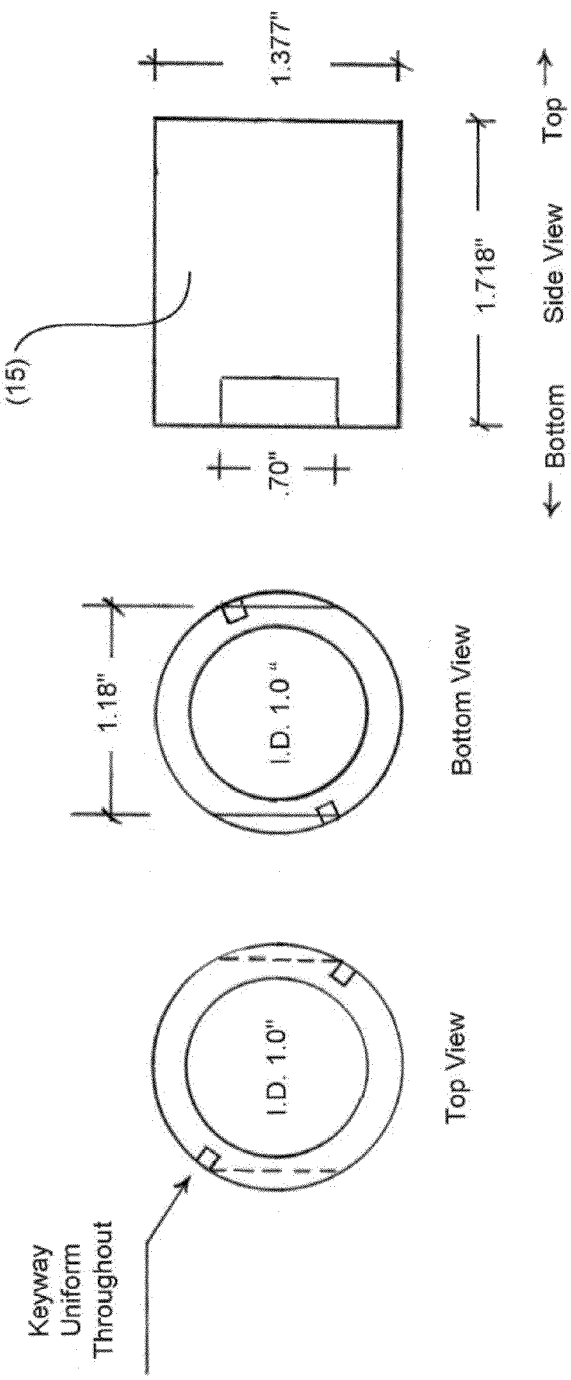
FIG. 17 shows three views of one embodiment of the shuttle (15) suitable for use in the device of the present invention.
Figure 18:
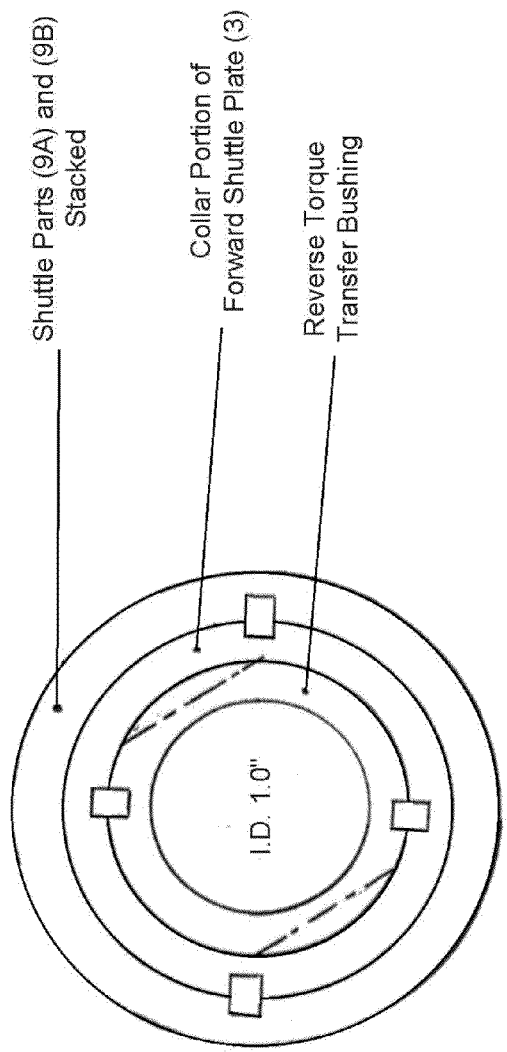
FIG. 18 shows a stacked view of one embodiment of the assembled shuttle mechanism suitable for use in the device of the present invention.

When in the engaged position, as shown in FIG. 4, after the actuator engagement prongs (17) provide force to the outside surface of the reverse shuttle plate (9A) which is part of the entire reverse gear package, the reverse gear package begins to move toward the pulley mounting plate (4). Before the engagement prongs of the rear wheel reverse plate (5) can engage with the pulley mounting plate (4), the extension end of the reverse shuttle plate mechanism (9B) pushes the forward shuttle plate (3) away from the pulley mounting plate (4) disengaging the engagement prongs of the forward shuttle plate (3) from the pulley mounting plate (4). Once the forward shuttle plate (3) is fully disengaged from the pulley mounting plate (4) and not before, the rear wheel reverse plate (5) of the reverse gear package engages the reciprocal engagement receptacles of the pulley mounting plate (4). At the same time, the engagement prongs of the reverse shuttle plate (9A) engage the reciprocal engagement receptacles of the sun gear (107). Now, when the belt drive exerts rotational force on the pulley (1), that force is transferred to the pulley mounting plate (4) which simultaneously rotates the rear wheel reverse plate (5) which in turn transfers rotational force to the outer ring of the planetary gear mechanism (7) which in turn rotates the otherwise stationary planetary gears (207) within the planetary gear mechanism which rotates the sun gear of the planetary gear mechanism (107) in an opposite direction to the pulley (1) and thus directs reverse rotational force through the reverse shuttle plate mechanism (9A), (9B) and (14) and consequently the forward shuttle plate (3) and ultimately the shuttle (15) and to the hub mounting plate (2) which is bolted to the wheel hub and thus rotates the wheel in a direction opposite to the pulley movement.

Referring to FIGS. 3 and 4, it will be appreciated by one skilled in the art that the clearances for the engagement of the tabs of forward shuttle plate (3) into pulley mounting plate (4) versus the clearances for the engagement of the tabs of the rear wheel reverse plate (5) into the pulley mounting plate (4) and the clearances for the engagement of the tabs of the reverse shuttle plate (9A) into the sun gear (107) are such that engagement of the rear wheel reverse plate (5) into the pulley mounting plate (4) and the engagement of the reverse shuttle plate (9A) into the sun gear (107) cannot even begin to occur until the forward shuttle plate (3) tabs have completely disengaged from the pulley mounting plate (4). In disengagement, the opposite is true. The disengagement of the rear wheel reverse plate (5) from the pulley mounting plate (4) and the reverse shuttle plate (9A) from the sun gear (107) must completely occur before the engagement of the tabs of the forward shuttle plate (3) can even begin to insert into the reciprocal tabs of the pulley mounting plate (4).

Also referring to FIGS. 3 and 4, it will be appreciated by one skilled in the art that the disengagement springs (11) and the shuttle plate mechanism stabilizer springs (14) are such that the disengagement springs are stronger than the stabilizer springs. For the presently described embodiment of the device of the present invention, suitable disengagement springs provide 90 inch pounds per spring such as provided by generic music wire compression springs of size 0.300× 0.047×½ inch such as provided by the Lee Spring Company Part No. W-1425632. Suitable stabilizer springs would provide only 20 inch pounds per spring with size appropriate to the dimensions disclosed in the shuttle mechanism figures depicting (9A) and (9B). The disengagement springs (11) need to be strong enough to keep the forward shuttle plate (3) engaged into the pulley mounting plate (4) at all times except when sufficient force is exerted through the actuator assembly to provide disengagement. The stabilizer springs (14) need to be strong enough to keep the forward shuttle plate (3) and the reverse shuttle plate components (9A) and (9B) in contact and act as one unit but not strong enough to overpower the disengagement springs (11).

This overall shuttle mechanism of one embodiment of the present invention provides a method whereby the pulley of a drive mechanism can exert force through to the hub of a wheel by engaging with either the forward drive components or the reversing gear components, but never both simultaneously.

It will be appreciated by one of skill in the art that the hub mounting plate (2) may rotate either clockwise or counter-clockwise depending upon the positioning of the shuttle mechanism within the device of the present invention.

It will be appreciate by one of skill in the art that forward shuttle plate (3) may rotate either clockwise or counter-clockwise depending upon the positioning of the shuttle mechanism within the device of the present invention.

Figure 19A:
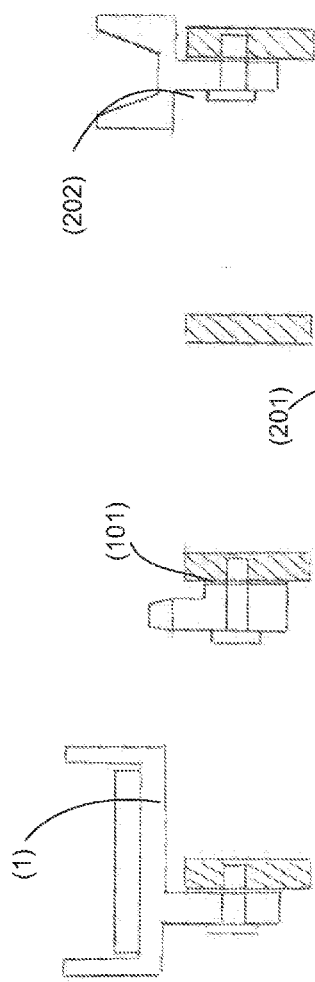
FIGS. 19A-D shows alternate potential embodiments for different pulleys (1) envisioned being suitable for use in the present invention.
Figure 19B:
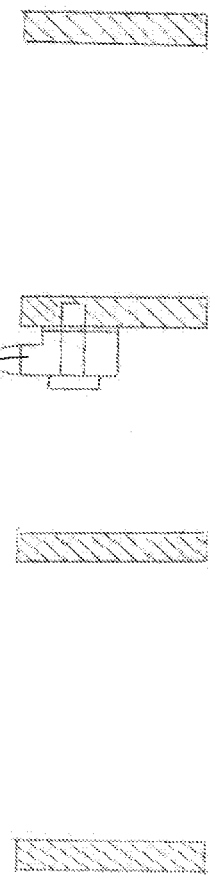
Figure 19C:
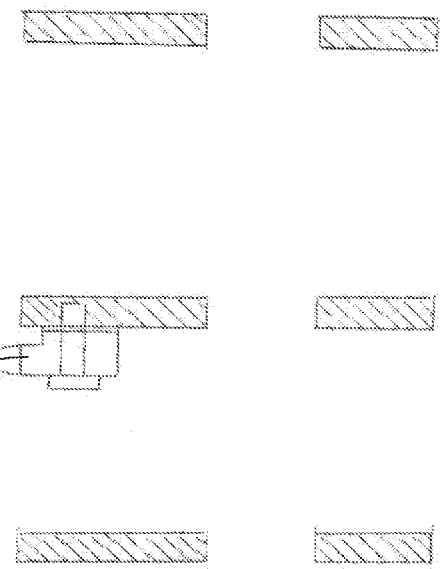
Figure 19D:
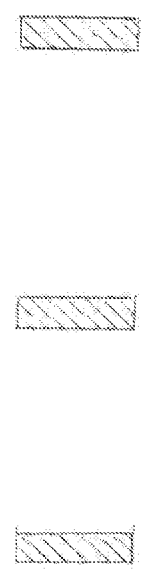

It will be appreciated by one of skill in the art that the pulley (1) only needs to rotate in one direction, that as originally intended by the device with which it is attached, and as powered by the device with which it is attached without any alteration to the device with which it is attached except as specifically described herein. The outer surface of the pulley (1) is identical to that of the original pulley that was attached to the device before replacement as described herein, the outer surface being mimicked exactly with respect to diameter, shape, number of teeth, if any, and width such that the original belt, chain or other connecting driving force mechanism may be interfaced and used identically to as originally intended. It will be appreciated by one of skill in the art that the pulley (1) may replace a nylon belt drive pulley wheel, a chain driven sprocket as shown in FIGS. 19B and 19C, a v-drive channel pulley as shown in FIG. 19D, and the like. The only requirement is that the interior portion of such pulley must be capable of modification to accept a pulley mounting plate (4) being directly attached with the other components as described herein being attached along the shuttle (15) in the order described. It will be appreciated by one of skill in the art that the pulley (1) can replace any size pulley drive wheel with an outside diameter larger or smaller than the pulley mounting plate (4) so long as there is enough interior circumference to insert an appropriately scaled shuttle mechanism through a central orifice.

It will be appreciated by one of skill in the art that the pulley mounting plate (4) will rotate only in the direction of the pulley as it will be attached and become part of the pulley (1).

It will be appreciated by one of skill in the art that in one embodiment of the present invention, certain of the components of the reverse gear package, specifically, the rear wheel reverse plate (5) and the outer ring of the planetary gear mechanism (7) will rotate in the same direction as the pulley when engaged, being operatively connected via the engagement of the rear wheel reverse plate (5) to the pulley mounting plate (4). The planetary gear anchor plate (6) and the planetary gear stabilizer ring (8) and the planetary gears (207) will remain stationary except for the rotation in place of the planetary gears (207) when engaged. The sun gear (107) will rotate opposite in direction to the pulley (1) when engaged as a result of the operation of the planetary gears (207). The reverse shuttle mechanism (9A), (9B) and (14) may rotate in either direction being operatively connected to the forward shuttle plate (3) through the shuttle (15) and will rotate in the same direction as the pulley (1) when in the disengaged position (i.e., when the forward shuttle (3) is engaged into the pulley mounting plate (4)) and will rotate in the opposite direction of the pulley (1) when in the engaged position (i.e., when the forward shuttle (3) is disengaged from the pulley mounting plate (4) and is itself engaged with the sun gear (107)). The planetary gear stabilizer ring (8) will always remain stationary being secured by the planetary gear stabilizing system (22).

It will be appreciated by one of skill in the art that there may be an embodiment of the device of the present invention where it may be desirable to not secure the planetary gear stabilizer ring (8) to have it remain constantly stationary. Similarly, it will be appreciated by one of skill in the art that there may be an embodiment of the device of the present invention where it may be desirable for any or all of the components of the reverse gear package to rotate in either direction and modifications may be made such that both parts of the shuttle mechanism may rotate in harmony with each other or opposite to each other with alternate respective configurations of the shuttle (15).

An Alternate Embodiment of the Reverse Gear Package

Figure 20:
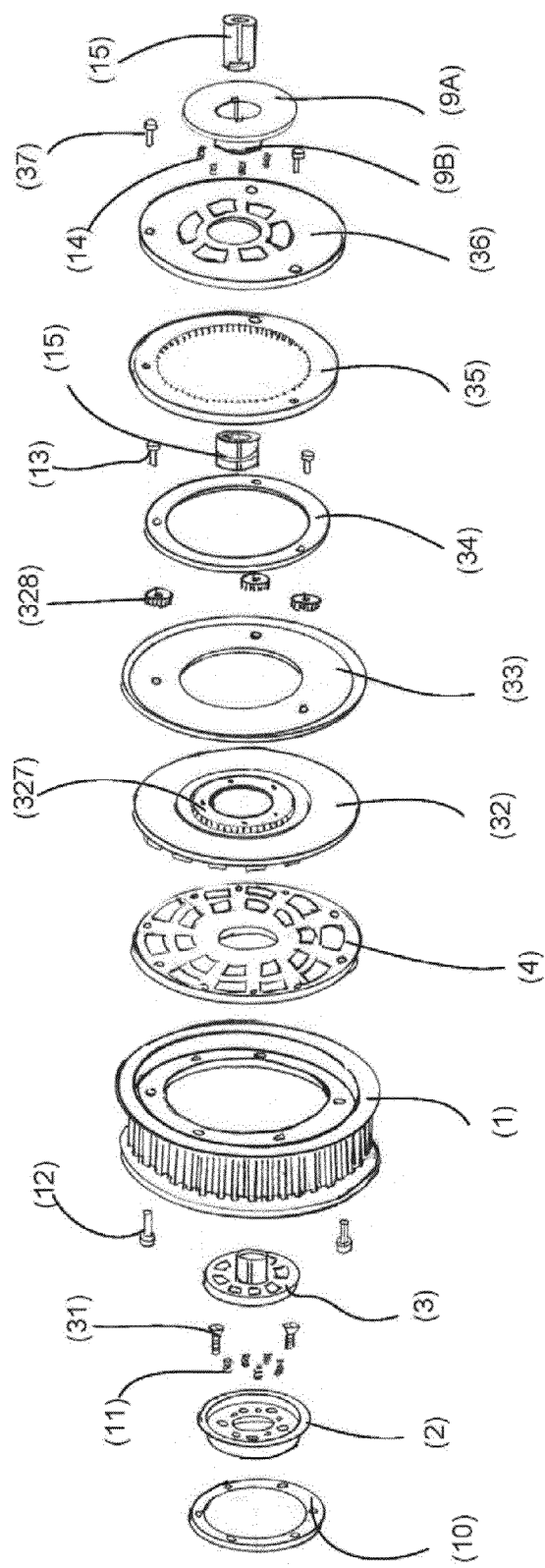
FIG. 20 depicts an exploded view of an alternate embodiment of the device of the present invention, showing the pulley (1), the hub mounting plate (2), the forward shuttle plate (3), the pulley mounting plate (4), the pulley retainer ring (10), the disengagement springs (11), hub mounting plate screws (31) and drive shuttle (15) exactly as in the previous embodiment with the reverse gear package being replaced by an alternate rear wheel reverse plate (32) with an attached sun gear (327), an alternate planetary gear anchor plate (33), an alternate planetary gear stabilizer ring (34), an alternate outer ring gear (35) an alternate engagement plate (36), planetary gears (328), and the reverse shuttle plate mechanism (9A) (9B) and (14).
Figure 21:
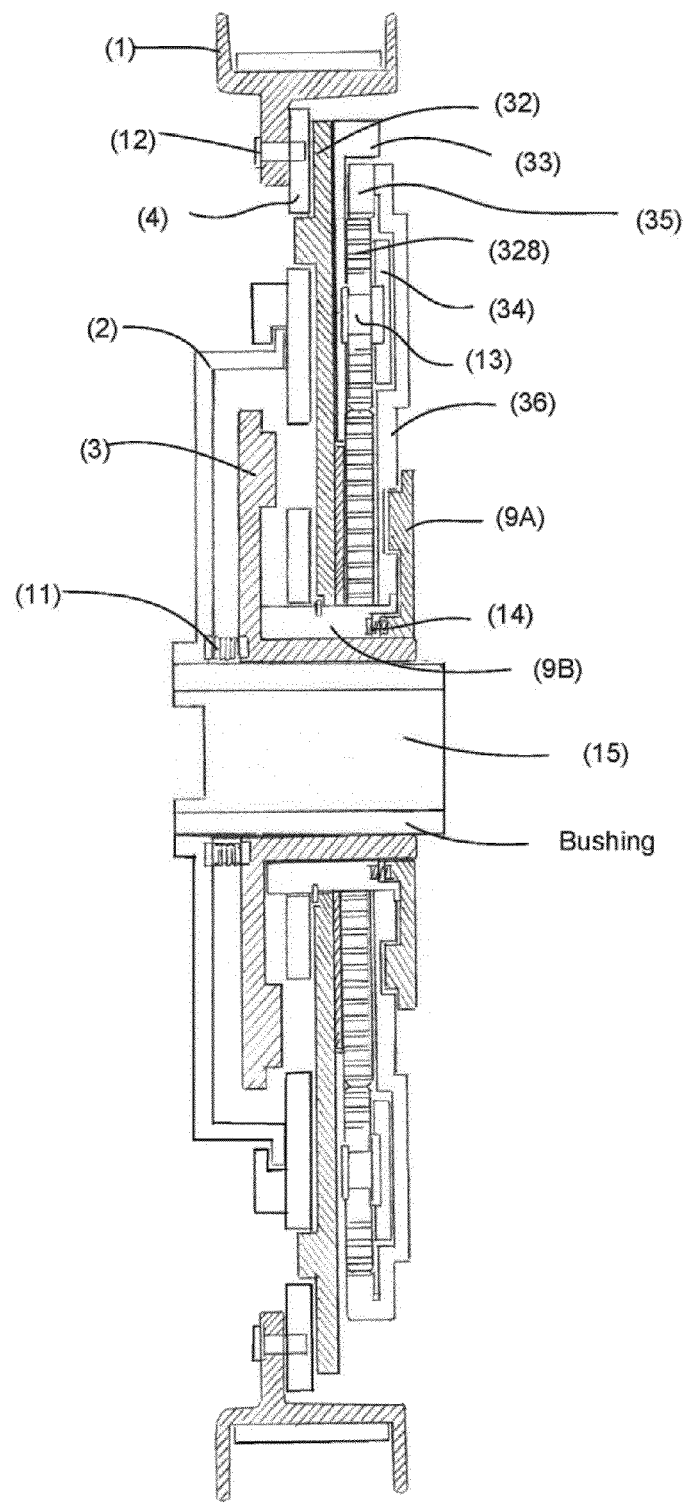
FIG. 21 depicts a slice view of the assembled embodiment of the device of the present invention as depicted in FIG. 20 in the engaged position that results in reversing the normal forward operation of the device to which it is attached showing the rear wheel reverse plate (32) of the alternate reverse gear package consisting of an alternate rear wheel reverse plate (32) with an attached sun gear (327), an alternate planetary gear anchor plate (33), an alternate planetary gear stabilizer ring (34), an alternate outer ring gear (35) an alternate engagement plate (36), planetary gears (328), and the reverse shuttle plate mechanism (9A) (9B) and (14) engaged with the pulley mounting plate (4) and the forward shuttle plate (3) disengaged from the pulley mounting plate (4) as a result of the inward movement of the reverse shuttle plate assembly (9A)(9B) and (14) forcing the forward shuttle plate (3) inward (compressing the disengagement springs (11)) and releasing from the pulley mounting plate (4)).

For example, as disclosed in FIGS. 20 and 21, the shuttle mechanism may engage and disengage an alternate embodiment for engagement of a reverse gear package arrangement.

In this alternate embodiment, an actuator assembly (21) is used to exert inward force to the outside the reverse shuttle plate (9A). After the actuator engagement prongs (17) provide force to the outside surface of the reverse shuttle plate (9A) which is part of the entire reverse gear package, the reverse gear package begins to move toward the pulley mounting plate (4). Before the engagement prongs of the rear wheel reverse plate (32) can engage with the pulley mounting plate (4), the extension end of the reverse shuttle plate mechanism (9B) pushes the forward shuttle plate (3) away from the pulley mounting plate (4) disengaging the engagement prongs of the forward shuttle plate (3) from the pulley mounting plate (4). Once the forward shuttle plate (3) is fully disengaged from the pulley mounting plate (4) and not before, the rear wheel reverse plate (32) of the reverse gear package engages the reciprocal engagement receptacles of the pulley mounting plate (4). At the same time, the engagement prongs of the reverse shuttle plate (9A) engage the reciprocal engagement receptacles of the reverse gear engagement plate (36). Now, when the belt drive exerts rotational force on the pulley (1), that force is transferred to the pulley mounting plate (4) which simultaneously rotates the rear wheel reverse plate (32) which has an internally mounted sun gear (327) which is operationally connected to the planetary gears (328) which are held in place via the planetary gear anchor plate (33) and the planetary gear stabilizer ring (34). When the sun gear (327) provides rotational force to the planetary gears (328), the planetary gears rotate the outer ring gear plate (35) in a direction opposite to the pulley(l). The outer ring gear plate (35) is connected to the reverse gear engagement plate (36) which is now engaged to the reverse gear shuttle (9A) and thus directs reverse rotational force through the reverse shuttle plate mechanism (9A), (9B) and (14) and consequently the forward shuttle plate (3) and ultimately the shuttle (15) and to the hub mounting plate (2) which is bolted to the wheel hub and thus rotates the wheel in a direction opposite to the pulley movement.

It will be appreciated by one of skill in the art that the full shuttle mechanism, the hub mounting plate (2), the forward shuttle plate (3), the disengagement springs (11), the reverse shuttle mechanism (9A), (9B) and the reverse shuttle stabilizer springs (14) operate to engage and disengage the reverse gear package the same in both embodiments described herein. However, there may be advantages to one reverse gear package over another depending on the desired torque outcome and applied gear ratios. In the first embodiment described above, the shuttle will rotate in accordance with the revolutions of the sun gear (107) as the force applied through the reverse shuttle mechanism (9A) and (9B) is directly applied by the revolutions of the sun gear. In this alternative embodiment, the shuttle mechanism (9A) and (9B) rotates in accordance with the revolutions of the outer ring gear plate (35) which is an alternate gear ratio package.

It will be appreciated by one of skill in the art that the gear ratio may be manipulated by using alternative embodiments and alternative gear configurations to that disclosed herein, all of which are well known in the art.

The present invention is further illustrated, but not limited by, the following examples.

EXAMPLES

The device of the present invention may be implemented exactly as described in the first embodiment above with all dimensions as disclosed and specific brands and part numbers as detailed in FIGS. 1-19A with a Harley Davidson® 2001 FLSTF FatBoy.

In another example, the device of the present invention may be adjusted with all sizes, dimensions and forces disclosed proportionally altered to fit a smaller or larger motorcycle.

In another example, the device of the present invention may be adjusted with all sizes, dimensions and forces disclosed proportionally altered to be implemented with something other than a motorcycle, for example, a lawn tractor or a non-motorized bicycle.

In another example, it will be appreciated by one of skill in the art that the device of the present invention may be altered with all sizes, dimensions and forces disclosed proportionally altered to implement the device of the present invention on any scale, for example, from micro-devices, for example, a die-cast model miniature vehicle, to macro-devices, for example, industrial, commercial, naval or aeronautical equipment. It will be appreciated, however, that when making such extreme proportional changes, the sizes, dimensions and forces may not be exactly proportional to those disclosed herein. For example, there will be a minimal exertion spring force to achieve disengagement below which disengagement will not be achieved although exact proportionality may dictate otherwise. One of skill in the art, with minimal experimentation, will be able to make such adjustments without changing the inventive configuration of the device of the present invention.

Publications cited throughout this document are hereby incorporated by reference in their entirety. Although the various aspects of the invention have been illustrated above by reference to examples and preferred embodiments, it will be appreciated that the scope of the invention is defined not by the foregoing description but by the following claims properly construed under principles of patent law.

What is claimed is:

1. A device comprising:
   a. a shuttle mechanism engaged and disengaged by an actuator assembly;
   b. that when disengaged allows a left gear package to engage with a mating plate attached to a pulley drive and prevents a right gear package from engaging with said mating plate attached to the pulley drive;
   c. and when engaged allows said right gear package to engage with said mating plate attached to the pulley drive and prevents said left gear package from engaging with said mating plate attached to the pulley drive.

2. The device of claim 1 wherein the pulley drive is capable of replacing the existing sheave or sprocket of a motorcycle drive mechanism such that said pulley drive mimics exactly the outer interface of said sheave or sprocket.

3. The device of claim 1 wherein the left gear package further comprises a hub mounting plate.

4. The device of claim 1 wherein the right gear package further comprises a planet gear assembly capable of providing a reverse direction.

5. The device of claim 4 wherein said planet gear assembly is configured such that the sun gear of said planet gear assembly rotates opposite to the direction of the pulley drive when said right gear package engages with said mating plate attached to the pulley drive.

6. The device of claim 4 wherein said planet gear assembly is configured such that the sun gear of said planet gear assembly rotates in the same direction as the pulley drive when said right gear package engages with said mating plate attached to the pulley drive.

* * * * *